(12) United States Patent
Nakagawa et al.

(10) Patent No.: US 7,308,637 B2
(45) Date of Patent: Dec. 11, 2007

(54) DATA RECORDING/REPRODUCING DEVICE, DATA RECORDING/REPRODUCING METHOD, PROGRAM, AND RECORDING MEDIUM

(75) Inventors: Toshiyuki Nakagawa, Kanagawa (JP); Yoshio Muraoka, Tokyo (JP); Hiroaki Eto, Kanagawa (JP)

(73) Assignee: Sony Corporation, Tokyo (JP)

( * ) Notice: Subject to any disclaimer, the term of this patent is extended or adjusted under 35 U.S.C. 154(b) by 584 days.

(21) Appl. No.: 10/920,583

(22) Filed: Aug. 18, 2004

(65) Prior Publication Data

US 2005/0044469 A1 Feb. 24, 2005

(30) Foreign Application Priority Data

Aug. 18, 2003 (JP) ............................ P2003-294263
Aug. 19, 2003 (JP) ............................ P2003-294869

(51) Int. Cl.
*G11B 20/18* (2006.01)
(52) U.S. Cl. ..................... 714/758; 714/769; 714/770
(58) Field of Classification Search .............. 714/758, 714/769, 770; *G11B 20/18*

See application file for complete search history.

(56) References Cited

U.S. PATENT DOCUMENTS

2005/0149827 A1* 7/2005 Lambert et al. ............ 714/770

FOREIGN PATENT DOCUMENTS

| JP | 403041675 A | * | 7/1989 |
| JP | 411053836 A | * | 7/1997 |
| JP | 411053837 A | * | 7/1997 |
| JP | 2000-276856 | | 10/2000 |
| JP | 2000-278645 | | 10/2000 |

OTHER PUBLICATIONS

Riggle et al.; Design of Error Correction Systems for Disk Drives; IEEE Transactions on Magnetics, vol. 34, No. 4, Jul. 1998; pp. 2362-2371.*

* cited by examiner

*Primary Examiner*—R. Stephen Dildine
(74) *Attorney, Agent, or Firm*—Belly, Boyd & Lloyd LLP

(57) ABSTRACT

A stable system is provided wherein the influence of disturbance or the like can be reduced. First error correcting code units and second error correcting code units are used, and thereby a wider range of random errors and burst errors are made correctable to avoid retry operation. Thus, stable data reproduction is carried out without degrading transfer rate. Further, the constitution of error correcting blocks is set so that when a head is moved to some track during seek operation, a sector having the second error correcting code recorded therein is the first sector to be read.

20 Claims, 20 Drawing Sheets

SERVO AREA

F I G. 6

| CONTENT NUMBER | TRACK NUMBER | HEAD NUMBER |
|---|---|---|
| 1 | 0~99 | 0 |
| 2 | 100~129 | 0 |
| 3 | 200~249 | 0 |
| 4 | 130~199 | 0 |
| 5 | 300~399 | 0 |
| ⋮ | ⋮ | ⋮ |
| ⋮ | ⋮ | ⋮ |
| 9 | 470~499 | 0 |
| UNASSIGNED | – | – |
| UNASSIGNED | – | – |
| UNASSIGNED | – | – |
| ⋮ | ⋮ | ⋮ |
| ⋮ | ⋮ | ⋮ |
| UNASSIGNED | 500~999 | 0 |
| UNASSIGNED | 0~999 | 1 |

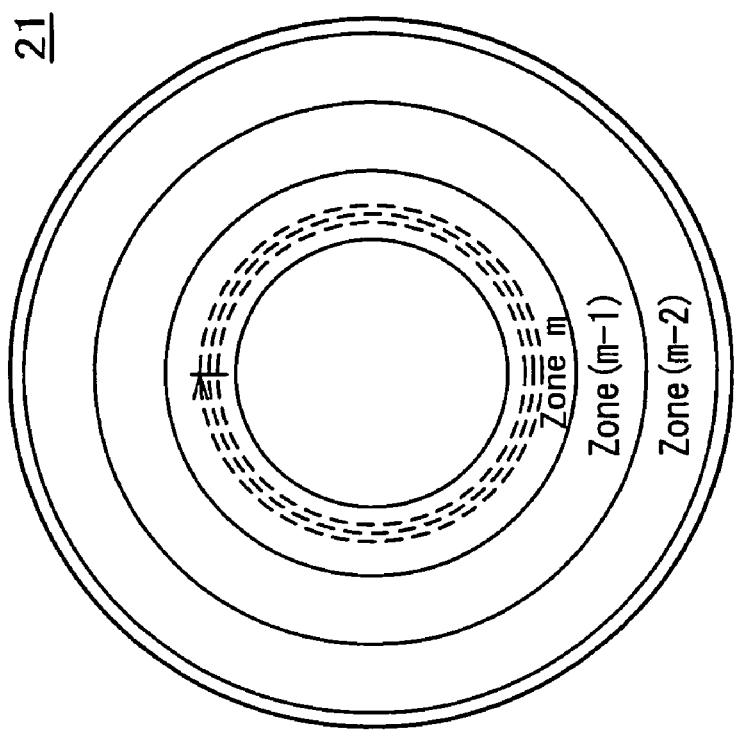
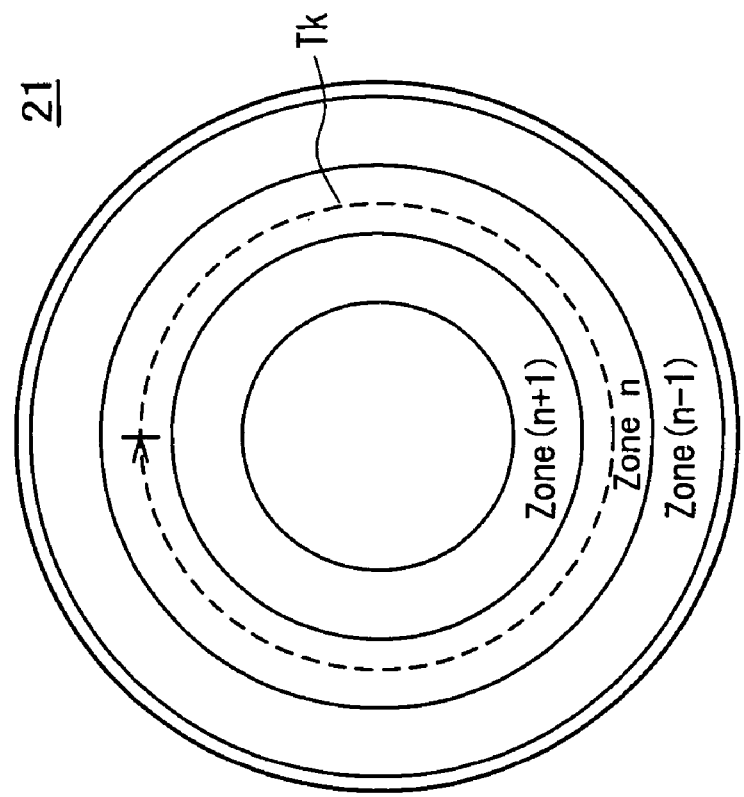

FIG. 10

| 0 | header0 |
|---|---|
| 1 | header1 |
| 2 | header2 |
| 3 | header3 |
| 4 | DATA0 |
| 5 | DATA1 |
| 6 | DATA2 |
| 7 | DATA3 |
| 8 | DATA4 |
| 9 | DATA5 |
| ... | ... |
| 511 | DATA507 |
| 512 | DATA508 |
| 513 | DATA509 |
| 514 | DATA510 |
| 515 | DATA511 |
| 516 | CRC0 |
| 517 | CRC1 |
| 518 | CRC2 |
| 519 | CRC3 |
| 520 | Parity000 |
| 521 | Parity100 |
| 522 | Parity200 |
| 523 | Parity300 |
| ... | ... |
| 564 | Parity011 |
| 565 | Parity111 |
| 566 | Parity211 |
| 567 | Parity311 |

EXAMPLE OF TRACK-BY-TRACK DISPOSITION OF SECTORS WITH LBA PROVIDED

EXAMPLE OF TRACK-BY-TRACK DISPOSITION OF SECTORS WITH LBA NOT PROVIDED BUT RELATIVE ADDRESS PROVIDED

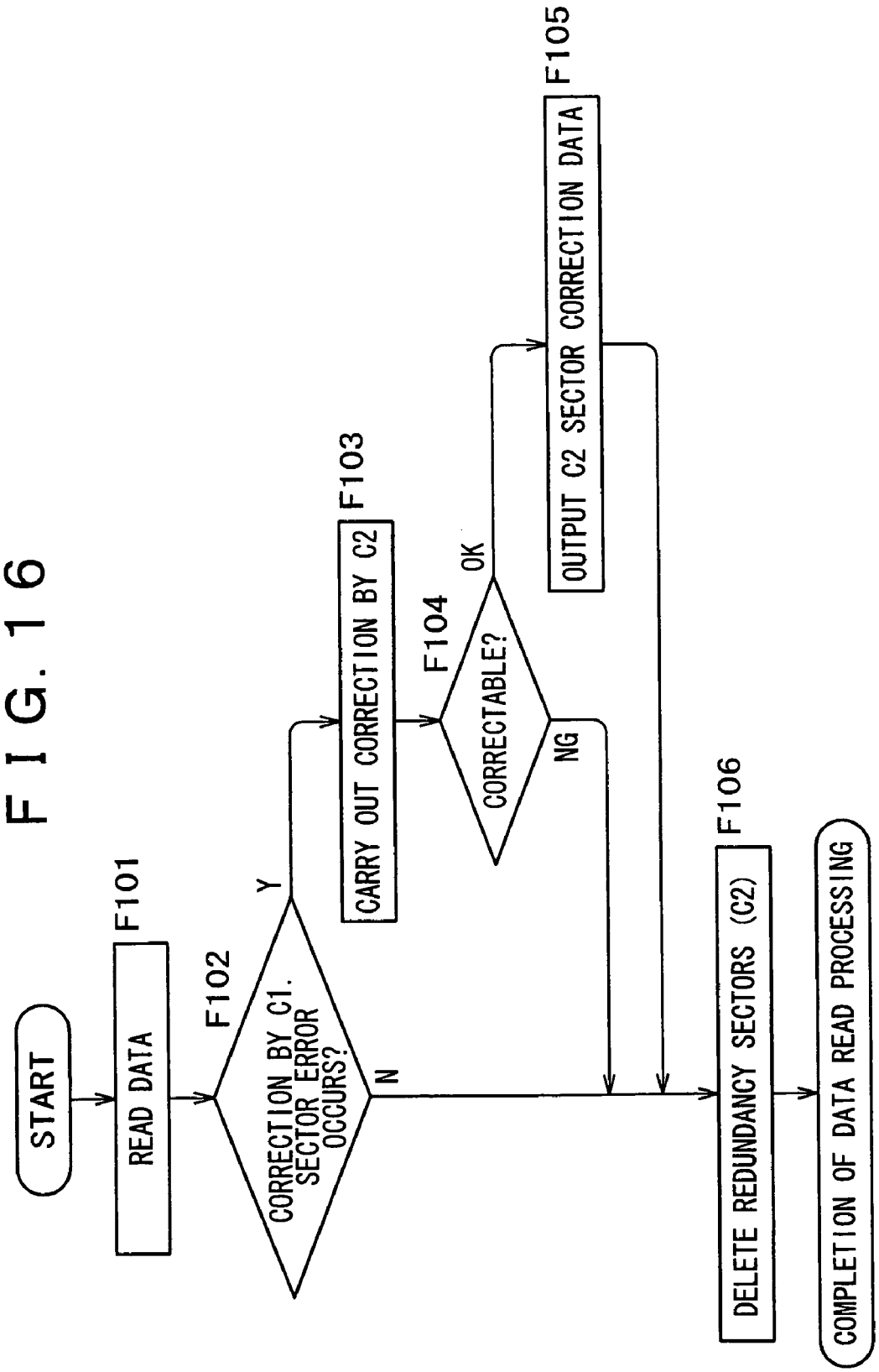

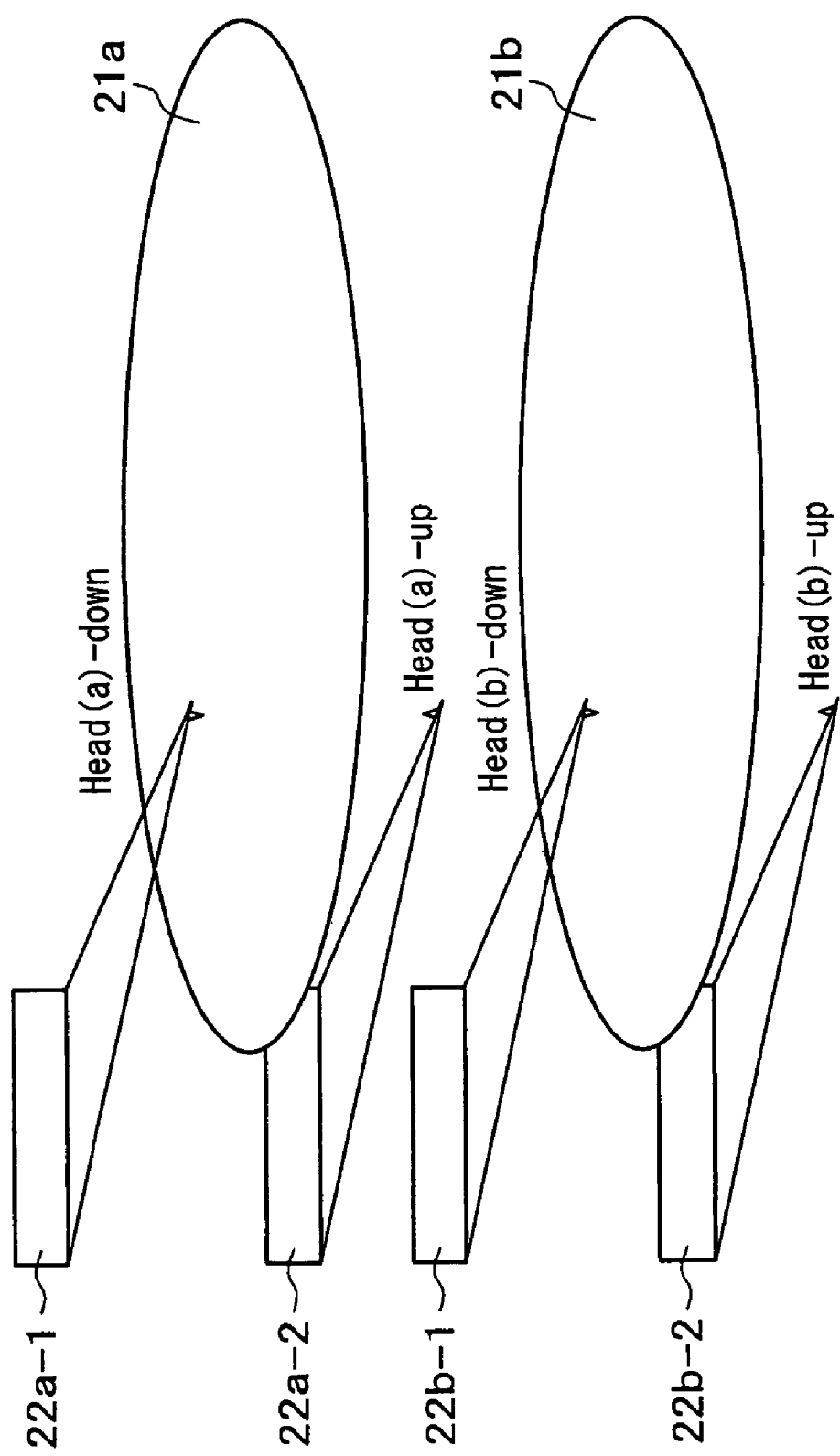

BACK FACE OF MAGNETIC DISK 21a

FRONT FACE OF MAGNETIC DISK 21a

FRONT FACE OF MAGNETIC DISK 21b

BACK FACE OF MAGNETIC DISK 21b

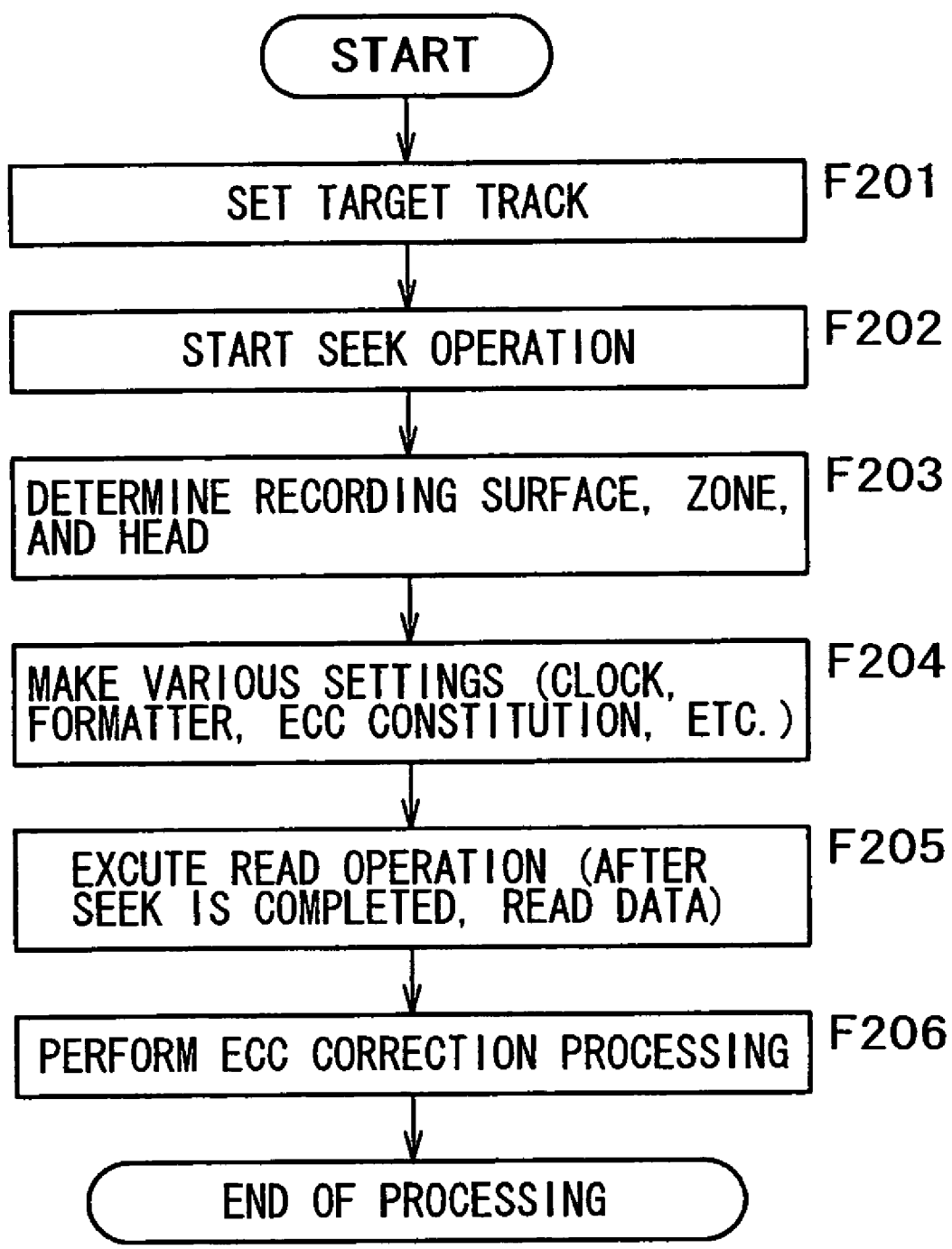

DATA RECORDING/REPRODUCING DEVICE, DATA RECORDING/REPRODUCING METHOD, PROGRAM, AND RECORDING MEDIUM

BACKGROUND OF THE INVENTION

DESCRIPTION OF RELATED ART

[Patent Document 1] Japanese Unexamined Patent Publication No. 2000-276856.

[Patent Document 2] Japanese Unexamined Patent Publication No. 2000-278645.

The present invention relates to a data recording/reproducing device and a data recording/reproducing method for a randomly accessible recording medium, a computer program, and a recording medium. More particularly, the present invention relates to a technique for a disk-type recording medium, such as a hard disk, wherein data read/write operation is performed by sweeping a magnetic head over a magnetic disk as a medium. In addition, the present invention relates to a technique for shortening the time required to access a desired data storage location, as well as to recording and reproducing data with stability.

As information technology develops, such as information processing and information communication, reuse of information created and edited in the past has become necessary. For this reason, information storage technology has becomes increasingly important. Up to now, information recording devices using various media, such as magnetic tape and magnetic disk, have been developed and have come into widespread use.

Of these information recording devices, HDD (Hard Disk Drive) is an auxiliary storage device of magnetic recording type. In the HDD unit, a number of magnetic media as recording media are housed, and are turned at high speed by a motor. The medium is coated with magnetic material, such as iron oxide and cobalt chromium, by plating or thin film formation.

The magnetic head is swept over the surface of a turning medium in the radial direction, and thereby magnetization corresponding to data is caused on the medium. Thus, data can be written or read.

The hard disk has already become widespread. For example, as a standard external storage device for personal computer, hard disks are used to install various software programs, including operating systems (OS) required for starting computers and applications, and to store created or edited files. Usually, the HDD is connected with a computer main unit through a standard interface, such as IDE (Integrated Drive Electronics) and SCSI (Small Computer System Interface), and its memory space is managed by a file system, such as FAT (File Allocation Table), which is a subsystem of the operating system.

Recently, the capacity of HDDs has been more and more increased. In conjunction with this situation, the range of uses of the HDDs has been increased. They are not only used as auxiliary storage devices for computers as ever, but they have started to be used to record various contents. For example, HDDs are used as hard disk recorders for storing AV contents broadcast and received.

Here, low-level format methods for hard disks and the operation of writing and reading data to and from a hard disk will be considered with a case where it is used as an auxiliary storage device for a computer, for example.

As blocks for recording data, a large number of concentric "tracks" are formed on a hard disk. Then, track numbers of 0, 1, . . . are assigned to the tracks in this order from the outermost radius of the disk toward the inner radius. The memory capacity of the medium is increased with an increase in the number of tracks on the disk surface.

Further, each track is divided into "sectors" which are the unit of recording. That is, the operation of reading and writing data from and to a disk is usually carried out on a sector-by-sector basis. The sector size differs from medium to medium and, in general, that of the hard disk is set to 512 bytes. In consideration of the efficiency of use of media, the number of sectors is increased as the track is located at the outer radius, where the peripheral length is larger, to make the recording density of tracks substantially uniform. This is referred to as "zone bit recording."

If zone bit recording is adopted, the recording density of tracks can be made substantially uniform. However, this also poses a problem: the data transfer rate is varied from track to track. The data transfer rate becomes lower as the track is located at the inner radius of the disk.

In case of HDD so constituted that several media are concentrically overlapped, the tracks of the same number on these media can be considered to be cylindrically disposed. This is referred to as "cylinder." Each cylinder is provided with the same number as the corresponding track's number, and the cylinders are designated as Cylinder 0, Cylinder 1, . . . from the outermost radius in this order. A number of heads installed between media are integrally operated all the time, and move from cylinder to cylinder.

One of the methods for specifying (addressing) a target sector is CHS mode. This is a method in which PBA (Physical Block Address) on a disk is specified in the order of C (Cylinder), H (Head), and S (Sector) to access desired data.

However, the CHS method has a problem: the computer main unit which operates as host to HDD has limits on the CHS parameters it can specify, and this hinders increase in the capacity of the hard disk. To cope with this, LBA (Logical Block Address) mode is adopted. In this method, the cylinder number-head number-sector number (CHS) is represented by a logical serial number, designated as LBA, starting with 0.

In a conventional HDD, the following operation is performed to access a medium to read or write data from or to the medium. First, to make the magnetic head arrive at a track containing a target sector, the magnetic head is swept over the medium. This is referred to as the "seek" operation of the magnetic head. To make the magnetic head arrive at the target sector on the track, the magnetic head waits until the medium is turned and the target sector comes immediately beneath the head. This is referred to as "rotational delay."

With increase in the capacity of disks, the track density is increased, and the track width becomes very small. Therefore, to write and reproduce data with accuracy, high accuracy is required in positioning the magnetic head. To cope with this, servo technology for aligning the position of the magnetic head with the center of each track all the time is adopted. A signal referred to as "servo pattern" is written onto each track at constant intervals. Thus, whether the magnetic head is positioned in the center of a track can be checked by reading the pattern by the magnetic head. The servo pattern is written with accuracy in the HDD manufacturing process. In servo areas, for example, a signal for positioning the head, cylinder number, head number, servo number, and the like are written.

A lot of conventional HDDs have an interface, such as IDE and SCSI, intended to provide connection with a computer. Disk drive control from a computer main unit is basically the operation of specifying LBA indicating the leading sector and the number of sectors to be accessed, using command sets defined at the interface.

In this case, on the HDD side, access can be made from the specified leading sector. Further, access can be made while predicting sectors to be thereafter accessed and generating the sequence for carrying out look ahead.

This operation of "look ahead" is on the assumption that sectors having successive addresses are allocated to a series of data. Usually, sectors having successive addresses exist at successive head numbers or track numbers.

If large data is successively written onto a medium, look ahead operation effectively works during reading.

However, if fragmentation of the storage area progresses and large data is fragmented into small pieces and scattered to a number of locations, look ahead operation does not effectively work during reading. This is because wrong data is specified. This phenomenon may occur because the HDD does not grasp the file structure handled by the host (computer main unit or the like) which requests to read or write data.

If a prediction proves wrong due to a new access request from the host, the disk drive seeks the track containing a sector where the requested data exists. When tracking is completed, the disk drive waits until the target sector becomes accessible. At this time, a seek time and a rotational delay time are produced.

The amount of look ahead data which can be stored is limited by the capacity of a data buffer. If a situation in which a prediction proves wrong occurs continuously or sporadically, unused data on the data buffer is discarded in order of occurrence. While look ahead is being carried out, seek operation cannot be started.

As mentioned above, it can be said that seek time and rotational delay time, waste of time caused by delay in the start of seek operation due to ineffective look ahead, and loss of data due to ineffective look ahead have occurred.

In ordinary disk drives, the number of disk revolutions is increased to shorten the seek time and the rotational delay time. This is because the amount of data or data structure handled by the host, such as computer, does not have regularity and improvement by the accessing method is difficult. However, the method of increasing the number of disk revolutions is disadvantageous in terms of power consumption and memory capacity and is problematic.

In a lot of conventional external storage systems, such as HDD, errors are corrected on a sector-by-sector basis. (In general, one sector consists of 512 bytes.) Thus, random errors which occur in each sector can be corrected. However, random errors which exceed a correctable range or burst errors cannot be corrected. To cope with this, retry operation is performed or any other steps are taken to suppress read errors to a certain level or below.

However, such retry operation poses a problem: the head must be kept in rotational delay by one turn and then must reread data. For this reason, a further delay is caused in data read time.

For example, systems which handle AV convents require a high transfer rate for reproduction with HD (High Definition) picture quality or special reproduction. Therefore, even if an uncorrectable read error occurs in a sector, retry cannot be performed sometimes because of temporal restriction. In such a case, under the existing circumstances, there is no other choice but to proceed with the processing without correcting the error and, as a result, the reproduction quality is degraded.

With respect to this, various techniques have been developed. For example, Patent Document 2 above discloses the following switching technique: data blocks to be recorded are provided with information indicating their level of importance; based on this information, retry is performed with respect to important data blocks and is not with respect to other data blocks.

Patent Document 1 above discloses the following switching technique: data blocks to be recorded are provided with information indication their level of importance; based on this information, error correcting capability is enhanced with respect to important data blocks and ordinary correcting capability is used for other data blocks.

These techniques appropriately work to some degree, especially in a system handling AV contents or like systems. However, more effective techniques are demanded for avoiding retries or correcting errors.

Further, if any disturbance, such as vibration, is applied while AV contents are being read, errors are more prone to occur as compared with cases where a disturbance does not exist. For this reason, data whose error is uncorrectable is increased in amount, and eventually the reproduction quality is degraded.

In particular, errors with a disturbance applied are more prone to occur immediately after a seek operation is performed. One of the possible causes is that application of a disturbance lengthens the time for the head to get on track, which leads to an error.

This error can be a random error or a burst error. The greater a disturbance is, the more sectors wherein a random error is uncorrectable are increased in number.

One of other causes of increase in the frequency of the occurrence of error during reading is aging. When data written in the past is read, the similar phenomenon can be caused by deterioration in SPM (SPindle Motor) or VCM (Voice Coil Motor).

The occurrence of an error due to a disturbance immediately after seek also naturally has a harmful effect on data quality, access time, and transfer rate, with measures against these errors being demanded.

SUMMARY OF THE INVENTION

The present invention has been made with the above-mentioned problems taken into account. As a data recording/reproducing device, data recording/reproducing method, computer program, and recording medium, the present invention achieves the following results:

To shorten the time required to access a location where desired data is stored.

To reproduce data with stability without lowering the transfer rate.

To make a wider range of random errors and burst errors correctable, and avoid retry operation and degradation in data quality to reduce lowering of transfer rate for stable data reproduction.

To avoid the influence of an error due to a disturbance immediately after seek operation to reduce lowering of transfer rate for stable data reproduction.

The data recording/reproducing device according to the present invention is for disk recording media wherein concentric tracks are formed and each track is divided into a number of sectors. The data recording/reproducing device includes: a seeking part which seeks a target track; a data accessing part which makes access over the sought track; and an error correcting part which generates error correcting codes for correcting errors in data and corrects errors in data based on the error correcting codes. The error correcting part sets a first error correcting code unit for a predetermined data amount unit, and sets a second error correcting code unit for a number of first error correcting code units. Thus, the error correcting part forms an error correcting block including a number of the first error correcting code units and the second error correcting code units added thereto. Further, the error correcting part generates the error correcting block so that the following takes place: when the head is moved to some track on the disk recording medium by the seeking part, the sector having the second error correcting code recorded therein becomes the first sector to be read by the data accessing part.

In order that the sector having the second error correcting code recorded therein becomes the first sector to be read, the error correcting part forms the error correcting block so that the second error correcting code is disposed at the top at least in the error correcting block. Or, the error correcting part forms the error correcting block so that the second error correcting code is disposed at the top and the tail at least in the error correcting block.

Further, the error correcting part forms the error correcting block so that the error correcting block is completed by one or more tracks.

Further, the error correcting part generates error correcting codes by the Reed-Solomon code system.

Further, the error correcting block formed by the error correcting part has an interleaved structure in each first or second error correcting code unit.

Further, the disk recording medium has the servo areas radially formed in the respective positions on the disk recording medium.

Further, the data accessing part starts write access at the leading sector which has become accessible on the track sought by the seeking part, and accesses sectors equivalent to one track.

In this case, the data accessing part operates as follows: In write access, it assigns relative position addresses to the sectors one after another, starting with the first sector accessed on the track. In read access, the data accessing part reconstitutes the data read from sectors on the track according to the relative position addresses, and thereby reproduces the written data.

Further, the error correcting part forms the error correcting block so that two or more error correcting blocks do not exist on each track and the error correcting block is completed by one or more tracks.

The data recording/reproducing method according to the present invention is for disk recording media wherein concentric tracks are formed and each track is divided into a number of sectors. The data recording/reproducing method includes: a seeking step in which a target track is sought; a data accessing step in which access is made over the sought track; and an error correcting step in which error correcting codes are generated for correcting errors in data and errors in data are corrected based on the error correcting codes. In the error correcting step, a first error correcting code unit is set for a predetermined data amount unit, and a second error correcting code unit is set for a number of first error correcting code units. Thus, an error correcting block is formed which includes a number of the first error correcting code units and the second error correcting codes added thereto. Further, the error correcting block is generated so that the following takes place: when the head is moved to some track on the disk recording medium in the seeking step, the sector having the second error correcting code recorded therein becomes the first sector to be read in the data accessing step.

In the error correcting step, the error correcting block is formed so that the second error correcting code is disposed at the top at least in the error correcting block. Or, it is formed so that the second error correcting code is disposed at the top and the tail.

Further, in the error correcting step, the error correcting block is completed by one or more tracks.

Further, in the error correcting step, error correcting codes are generated by the Reed-Solomon code system.

Further, the error correcting block formed in the error correcting step has an interleaved structure in each first or second error correcting code unit.

Further, in the data accessing step, write access is started at the leading sector which has become accessible on the track sought in the seeking step and sectors equivalent to one track are accessed.

In this case, the data accessing step is carried out as follows: in write access, relative position addresses are assigned to the sectors one after another, starting with the first sector accessed on the track. In read access, the data read from sectors on the track is reconstituted according to the relative position addresses, and thereby the written data is reproduced.

Further, in the error correcting step, the error correcting block is formed so that two or more error correcting blocks do not exist on each track and the error correcting block is completed by one or more tracks.

The program according to the present invention is written in a computer-readable format for executing data recording/reproducing processing on a computer system. The data recording/reproducing processing is executed on disk recording media wherein concentric tracks are formed and each track is divided into a number of sectors. The program is for executing the steps in the data recording/reproducing method.

The recording medium according to the present invention is constituted so that the following takes place: a first error correcting code unit is set for a predetermined data amount unit, and a second error correcting code unit is set for a number of first error correcting code units. An error correcting block is formed which includes a number of the first error correcting code units and the second error correcting code units added thereto. Further, the error correcting block is so set that when the head is moved to some track by seek operation, the sector having the second error correcting code recorded therein becomes the first sector to be read. Data having the above-mentioned error correcting block structure is recorded on the recording tracks.

The above-mentioned desired goods are attained by the present invention.

A more specific description now will be given. Use of the first error correcting code (C1) unit enables the correction of random errors within sectors. Further, use of the second error correcting code (C2) unit enables the correction of errors which exceed a correctable range for intra-sector errors and burst errors which spread across sectors. By constituting the error correcting block as C1+C2, the following advantage is brought even under such circumstances that retry cannot be carried out to maintain a desired or higher data transfer rate: if error correction by C1 becomes infeasible, error correction can be carried out by C2. Therefore, a more stable system can be provided. By making a wider range of random errors and burst errors correctable and avoiding retry operation, stable data reproduction can be carried out without lowering the transfer rate.

Further, the error correcting block is constituted so that the following takes place: when the head is moved to some track by seek operation, the sector having the second error correcting code recorded therein (C2 sector) becomes the first sector to be read. Thus, immediately after seek operation, access is started at the C2 sector. The sector in which errors most frequently occur due to a disturbance or the like is C2 sector, and the above constitution minimizes the influence of a disturbance on data sectors.

In case of an error in a C2 sector, the loss of data due to the error can be effectively reduced even if the error exceeds preset ECC correcting capability. This is because even if a C2 sector is lost due to incapability of correcting an error, data sectors are not impaired; therefore, even if the error is uncorrectable, data sectors are expected to be normal.

As mentioned above, the data accessing part starts write access at the leading sector which has become accessible on the track sought by the seeking part, and accesses sectors equivalent to one track. As such, accesses sectors equivalent to one track, starting with, for example, the sector where the magnetic head got on track. Thus, in write operation, rotational delay can be eliminated. In read access, access is made on a track-by-track basis and uncertain processing, look ahead, is omitted. As a result, the timing with which seek operation is started can be determined with reliability.

In this case, in particular, another advantage is brought. In write access, the data accessing part assigns relative position addresses to sectors one after another, starting with the sector at which access is started on the track. In read access, the part reconstitutes data read from sectors on the track according to the relative position addresses, and thereby reproduces the written data. Thus, access can be started at any sector on the track.

As mentioned above, read/write operation can be started in any head position immediately after seek operation, and the rotational delay can be minimized. As a result, the number of seeks is minimized, and the access time is shortened. In this case, as well, if measures are taken so that any head position immediately after seek corresponds to C2 sector, the influence of a disturbance can be minimized during read access.

In this accessing method, an origin of request to write or read (e.g., host device, such as computer, connected with the HDD) need not consider the addresses of sectors on the disk. Further, use of the relative position address, which enables reduction in data size, allows storage areas to be effectively utilized.

In read access, data read from sectors on the track is reconstituted, for example, in buffer memory according to the relative position addresses. Thus, the original data can be reconstructed regardless of the position of the sector at which access was started. At this time, taking the following measures is appropriate: the error correcting block is formed so that two or more error correcting blocks do not exist on each track, and the error correcting block is completed by one or more tracks.

The present invention has been made with the above-mentioned problems taken into account. As a data recording/reproducing device, data recording/reproducing method, computer program, and recording medium, the present invention attains the following objects:

To shorten the time required to access a location where desired data is stored.

To reproduce data with stability without lowering the transfer rate.

To make a wider range of random errors and burst errors correctable, and thereby avoid retry operation and reduce lowering of transfer rate for stable data reproduction.

To implement an error correcting method which accommodates the fragmentation of format configuration.

The data recording/reproducing device according to the present invention is for disk recording media wherein concentric or spiral tracks are formed and each track is divided into a number of sectors. The data recording/reproducing device includes: a seeking part which seeks a target track; a data accessing part which makes access over the sought track; and an error correcting part which generates error correcting codes for correcting errors in data and corrects errors in data based on the error correcting codes. The error correcting part sets a first error correcting code unit for a predetermined data amount unit, and sets a second error correcting code unit for a number of the first error correcting code units. Thus, the error correcting part forms an error correcting block including a number of the first error correcting code units and the second error correcting code units added thereto. Further, the error correcting part changes the constitution of the error correcting block according to the part selected during the operation of writing/reading data to/from the disk recording medium.

At this time, the error correcting part changes the constitution of the error correcting block according to the following: selection of a read-write head, selection of a recording surface of a disk recording medium where data is written/read, or selection of a zone in the recording surface as the part selected during the operation of writing/reading data to/from the disk recording medium.

Further, the error correcting part changes the constitution of the error correcting block by changing the second error correcting code unit.

Further, the error correcting, part changes the constitution of the error correcting block by forming the error correcting block of only either of the first and second error correcting code units.

Further, the error correcting part generates error correcting codes by the Reed-Solomon code system. Further, the error correcting block has an interleaved structure in each first or second error correcting code unit.

The data accessing part starts access at the leading sector which has become accessible on the track sought by the seeking part, and accesses sectors equivalent to one track.

At this time, the data accessing part operates as follows: in write access, it assigns relative position addresses to the sectors one after another, starting with the first sector accessed on the track. In read access, the data accessing means reconstitutes the data read from sectors on the track according to the relative position addresses, and thereby reproduces the written data.

Further, the error correcting part forms the error correcting block so that two or more error correcting blocks do not exist on each track and the error correcting block is completed by one or more tracks.

The data recording/reproducing method according to the present invention is for disk recording media wherein concentric or spiral tracks are formed and each track is divided into a number of sectors. The data recording/reproducing method includes: a seeking step in which a target track is sought; a data accessing step in which access is made over the sought track; and an error correcting step in which error correcting codes are generated for correcting errors in data and errors in data are corrected based on the error correcting codes. In the error correcting step, a first error correcting code unit is set for a predetermined data amount unit, and a second error correcting code unit is set for a number of the first error correcting code units. Thus, an error correcting block is formed which includes a number of the first error correcting code units and the second error correcting code units added thereto. Further, the constitution of the error correcting block is changed according to the part selected during the operation of writing/reading data to/from the disk recording medium.

At this time, in the error correcting step, the constitution of the error correcting block is changed according to the following: selection of a read-write head, selection of a recording surface of a disk recording medium where data is written/read, or selection of a zone in the recording surface as the part selected during the operation of writing/reading data to/from the disk recording medium.

Further, in the error correcting step, the constitution of the error correcting block is changed by changing the second error correcting code unit.

Further, in the error correcting step, the error correcting block is formed of only either of the first and second error correcting code units.

In the error correcting step, error correcting codes are generated by the Reed-Solomon code system. Further, the error correcting block has an interleaved structure in each first or second error correcting code unit.

Further, in the data accessing step, access is started at the leading access which has become accessible on the track sought in the seeking step, and sectors equivalent to one track are accessed.

At this time, the data accessing step is carried out as follows: in write access, relative position addresses are assigned to the sectors one after another, starting with the first sector accessed on the track. In read access, the data read from sectors on the track is reconstituted according to the relative position addresses, and thereby the written data is reproduced.

Further, in the error correcting step, the error correcting block is formed so that two or more error correcting blocks do not exist on each track and the error correcting block is completed by one or more tracks.

The program according to the present invention is written in a computer-readable format for executing data recording/reproducing processing on a computer system. The data recording/reproducing processing is executed on disk recording media wherein concentric or spiral tracks are formed and each track is divided into a number of sectors. The program is for executing the steps in the data recording/reproducing method.

The recording medium according to the present invention is constituted so that the following takes place: a first error correcting code unit is set for a predetermined data amount unit, and a second error correcting code unit is set for a number of the first error correcting code units. An error correcting block is formed which includes a number of the first error correcting code units and the second error correcting code units added thereto. Further, the error correcting block is set according to recording surface, zone, and read-write head as the part selecting during the operation of writing/reading data to/from the disk recording medium. Data having the above-mentioned error correcting block structure is recorded on the recording tracks.

The above-mentioned desired objects are attained by the present invention.

Use of the first error correcting code (C1) unit enables the correction of random errors within sectors. Further, use of the second error correcting code (C2) unit enables the correction of errors which exceed a correctable range for intra-sector errors and burst errors which spread across sectors. By constituting the error correcting block as C1+C2, the following advantage is brought even under such circumstances that retry cannot be carried out to maintain a desired or higher data transfer rate: if error correction by C1 becomes infeasible, error correction can be carried out by C2. Therefore, a more stable system can be provided. By making a wider range of random errors and burst errors correctable and avoiding retry operation, stable data reproduction can be carried out without lowering the transfer rate.

Further, the constitution of the error correcting block is set according to the part, such as read-write head, recording surface, and zone, selected during the operation of writing/reading data to/from the disk recording medium. Thus, the following advantages are brought: variation in error correcting capability can be prevented from occurring in accordance with specialization of the sector format; and efficient error correction can be implemented in accordance with the characteristics of the head or the recording surface.

As mentioned above, the data accessing part starts access at the leading sector which has becomes accessible on the track sought by the seeking part, and accesses sectors equivalent to one track. The part accesses sectors equivalent to one track, stating with, for example, the sector where the magnetic heads got on track. That is, access is made on a track-by-track basis, and thereby uncertain process, look ahead, can be omitted and the timing with which seek operation is started can be determined with reliability.

In this case, especially, another advantage is brought. In write access, the data accessing part assigns relative position addresses to sectors one after another, starting with the sector at which access was started on the track. In read access, the part reconstitutes data read from sectors on the track according to the relative position addresses, and thereby reproduces the written data. Thus, access can be started at any sector on the track. Therefore, read/write operation can be started in any head position immediately after seek operation, and the rotational delay can be eliminated. As a result, the number of seeks is minimized, and the access time is shortened.

Further, an origin of request to write or read (e.g., host device, such as computer, connected with the HDD) need not consider the addresses of sectors on the disk. Further, use of the relative position address, which enables reduction in data size, allows storage areas to be effectively utilized.

In read access, data read from sectors on the track is reconstituted, for example, in buffer memory according to the relative position addresses. Thus, the original data can be reconstructed regardless of the position of the sector at which access was started. At this time, taking the following measures is appropriate: the error correcting block is formed so that two or more error correcting blocks do not exist on each track, and the error correcting block is completed by one or more tracks.

According to the present invention, the following advantages are brought: an excellent recording/reproducing device, data recording/reproducing method, program, and recording medium wherein data reproduction can be carried out with efficient redundancy due to error correcting code and stability can be provided.

Use of the first error correcting code unit enables the correction of random errors within sectors. Further, use of the second error correcting code unit enables the correction of errors which exceed a correctable range for intra-sector errors and burst errors which spread across sectors. Thus, errors can be appropriately corrected even under such circumstances that retry cannot be carried out to maintain a desired or higher data transfer rate, and a more stable system can be provided. By making a wider range of random errors and burst errors correctable and avoiding retry operation, stable data reproduction can be carried out without lowering the transfer rate.

Further, the error correcting block is constituted so that the following takes place: when the head is moved to some track by seek operation, the sector having the second error correcting code recorded therein (C2 sector) becomes the first sector to be read. Thus, immediately after seek operation, access is started at the C2 sector. The sector in which errors most frequency occur due to a disturbance or the like is C2 sector. Therefore, the above constitution minimizes the influence of a disturbance on data sectors and implements stable data reproduction.

Further, the constitution of the error correcting block is set according to the part, such as read-write head, recording surface, and zone, selected during the operation of writing/reading data to/from the disk recording medium. As a result, the error correcting block is changed in accordance with these characteristics (recording/reproducing capabilities). Thus, the following advantages are brought: variation in error correcting capability can be prevented from occurring; efficient error correction can be implemented; and efficient disk format can be implemented. These effects are produced even if the format configuration on the disk is specialized.

According to the foregoing, a more stable system can be provided.

Further, according to the present invention, access is started at the leading sector which has become accessible on the sought track, and write access is made to sectors equivalent to one track. Thus, access can be made on a track-by-track basis, and data write access control can be carried out without rotational delay. That is, the data access time can be shortened.

Even in such an accessing method, if measures are taken so that the head position immediately after seek corresponds to C2 sector, the influence of a disturbance can be minimized. That is, data can be stably read in read access.

Additional features and advantages of the present invention are described in, and will be apparent from, the following Detailed Description of the Invention and from the Figures.

BRIEF DESCRIPTION OF THE FIGURES

FIG. 6 is an explanatory drawing of conversion table for accessing in the embodiment.

FIGS. 7A and 7B are explanatory drawings of ECC block which is taken as track unit in the embodiment.

FIG. 10 is another explanatory drawing of the interleaved structure in the embodiment.

FIG. 16 is a flowchart illustrating the processing performed in reproducing operation in the embodiment.

FIG. 17 is an explanatory drawing illustrating another example of the configuration of the disks and heads in the embodiment.

FIG. 21 is a flowchart illustrating the processing performed in reproducing operation in the embodiment.

DETAILED DESCRIPTION OF THE INVENTION

Hereafter, referring to the figures, the embodiment of the present invention will be described in the order below:
1. Configuration of Hard Disk Drive
2. Servo Area
3. Access Operation
4. ECC Constitution
5. Setting of ECC Block Wherein Sector Immediately After Seek Is Taken as C2 Sector
6. Examples of Applications
1. Configuration of Hard Disk Drive FIG. 1 schematically illustrates the overall configuration of the HDD (Hard Disk Drive) 10 in an embodiment of the present invention.

Figure 1:
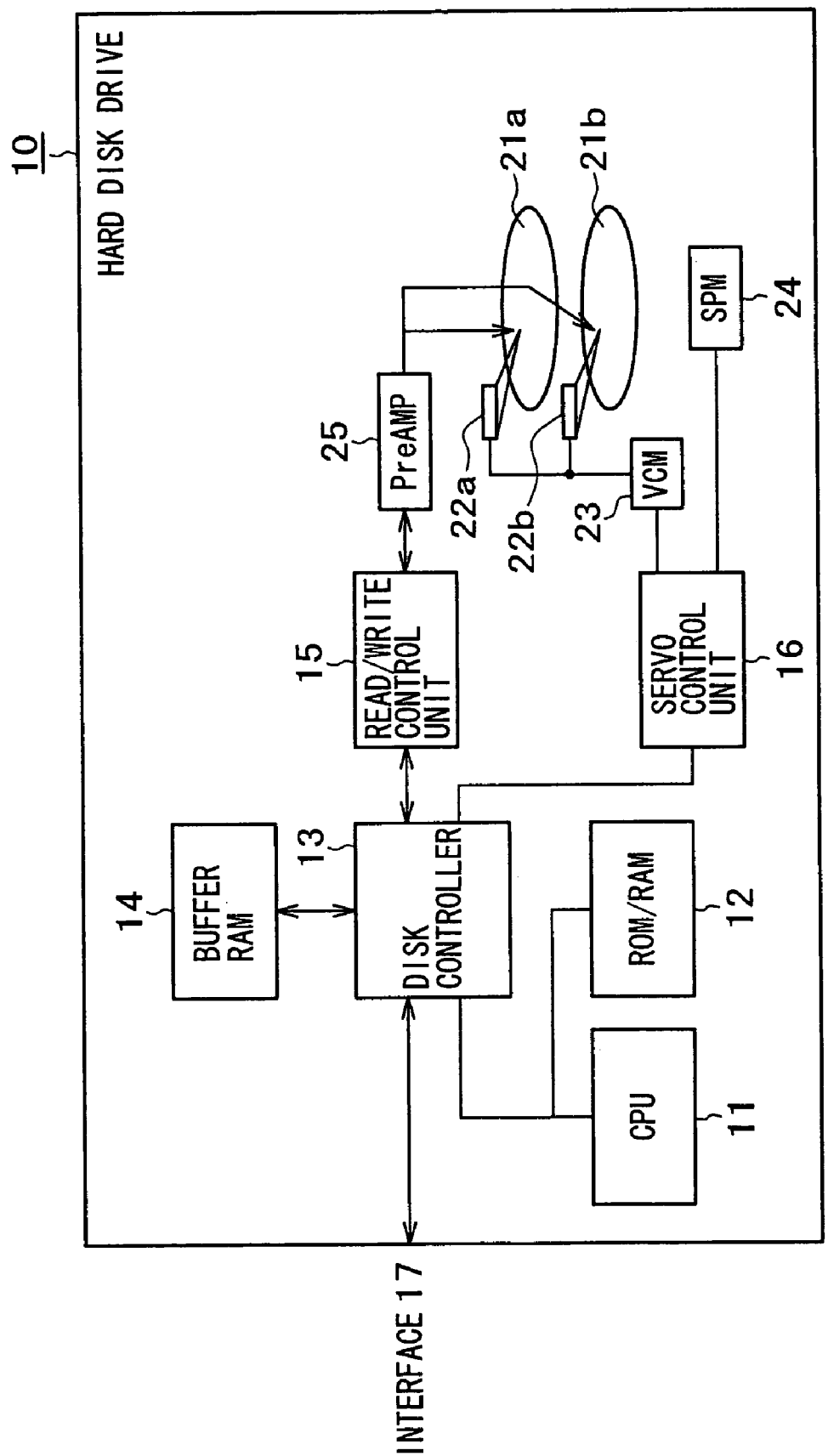
FIG. 1 is a block diagram of the overall configuration of the HDD in an embodiment of the present invention.

As illustrated in FIG. 1, the HDD 10 includes CPU (Central Processing Unit) 11, ROM (Read Only Memory)/RAM (Random Access Memory) 12, disk controller 13, buffer RAM 14, data read/write control unit 15, servo control unit 16, and magnetic disk 21.

One or more magnetic disks 21 are provided, and the recording surface is provided on either or both sides of the magnetic disks (the front and rear faces of the disks). A head is disposed above each of the recording surfaces. FIG. 1 shows a state in which two magnetic disks 21a and 21b are provided, and two read-write heads (magnetic heads) 22a and 22b are correspondingly provided.

In the drive unit, several magnetic disks (platters) are concentrically overlapped. The tracks on the magnetic disks of the same track numbers are cylindrically disposed (cylinder) and are specified by the same cylinder number as their track number.

Such a constitution that one read-write head 22 is provided for one magnetic disk 21, as illustrated in FIG. 1, is adopted when the recording surface is provided on either side of each magnetic disk 21.

If the recording surface is provided on both sides, two read-write heads 22 are provided for one magnetic disk 21.

In FIG. 1, the CPU 11 executes control codes stored in the ROM/RAM 12 and thereby controls the operation within the HDD 10 in a centralized manner.

The disk controller 13 receives a command from a host (not shown) connected through an interface 17. The CPU 11 processes this command, and the disk controller 13 instructs the hardware operation of the data read/write control unit 15 and the servo control unit 16 in accordance with the result of the command processing.

Write data received from the host through the interface 17 and data read from the magnetic disk 21, to be passed to the host are temporarily stored in the buffer RAM 14.

The data read/write control unit 15 performs encoding and modulating processing to generate data patterns to be actually recorded and writes data to the magnetic disks 21 through a preamplifier 25. Also, the data read/write control unit 15 takes in read data from the magnetic disks 21 through the preamplifier 25 and demodulates the data.

The servo control unit 16 synchronously drives a voice coil motor (VCM) 23 which moves arms mounted with the magnetic heads 22 and a spindle motor (SPM) 24 which turns the magnetic disks 21. Thus, the unit 16 carries out control so that the magnetic head 22 arrives in a predetermined range over a target track on a magnetic disk 21. Further, the unit 16 carries out control to cause the head to seek and move to a predetermined position based on servo patterns on the disk.

On the magnetic disk 21, a large number of tracks which are blocks where data is to be recorded are concentrically formed, and track numbers of 0, 1, 2, . . . are assigned to the tracks in this order from the outermost radius of the disk 21 toward the inner radius. Each track is further divided into sectors, and this sector is the minimum unit by which data read/write operation can be performed.

The amount of data each sector can hold is fixed, for example, to 512 bytes.

Actually, in the sector, header information, code for error correction, and the like are recorded in addition to data.

With respect to the number of sectors per track, the ZBR (Zone Bit Recording) method is adopted wherein the number of sectors is increased as the track is located at the outer radius where the peripheral length is larger. That is, the number of sectors throughout the circumference of the magnetic disk 21 is not uniform between tracks. Instead, the following constitution is adopted: the magnetic disk 21 is radially partitioned into a number of zones, and the number of sectors is made equal on the tracks in the respective zones.

Figure 3:
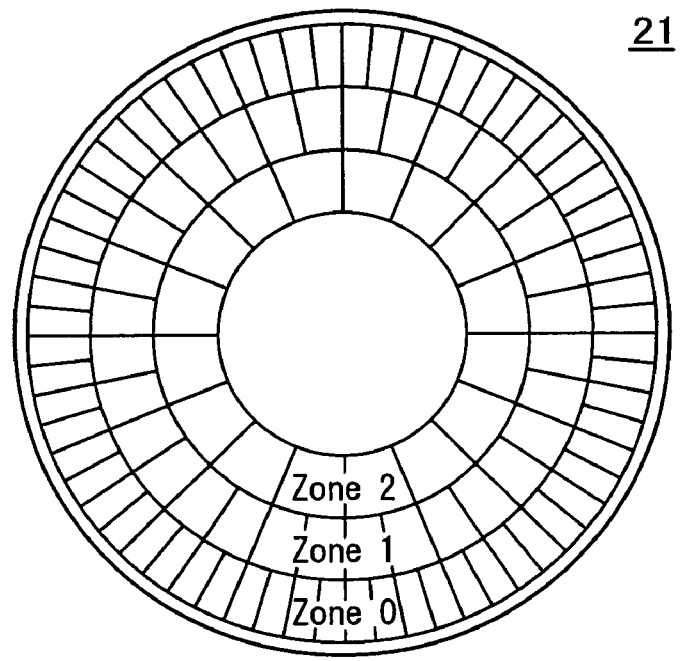
FIG. 3 is an explanatory drawing schematically illustrating the disk format structure in the embodiment.

FIG. 3 illustrates an example of the ZBR method.

In the example illustrated in FIG. 3, the disk is partitioned into three zones, and the zones are provided with zone numbers of 0, 1, and 2 in this order from the outermost zone. Each zone includes a number of tracks.

In FIG. 3, each zone is divided into sectors. In this case (strictly as a schematic example), Zone 0 is composed of 64 sectors; Zone 1 is composed of 32 sectors; and Zone 2 is composed of 16 sectors. With respect to the relation between zones, the concrete number of sectors is determined so that the linear recording density will be within a predetermined range and the memory capacity per disk will be increased. This is accomplished by making constant the number of revolutions of the spindle motor 24, varying read-write clock, and taking the other like measures.

Figure 2:
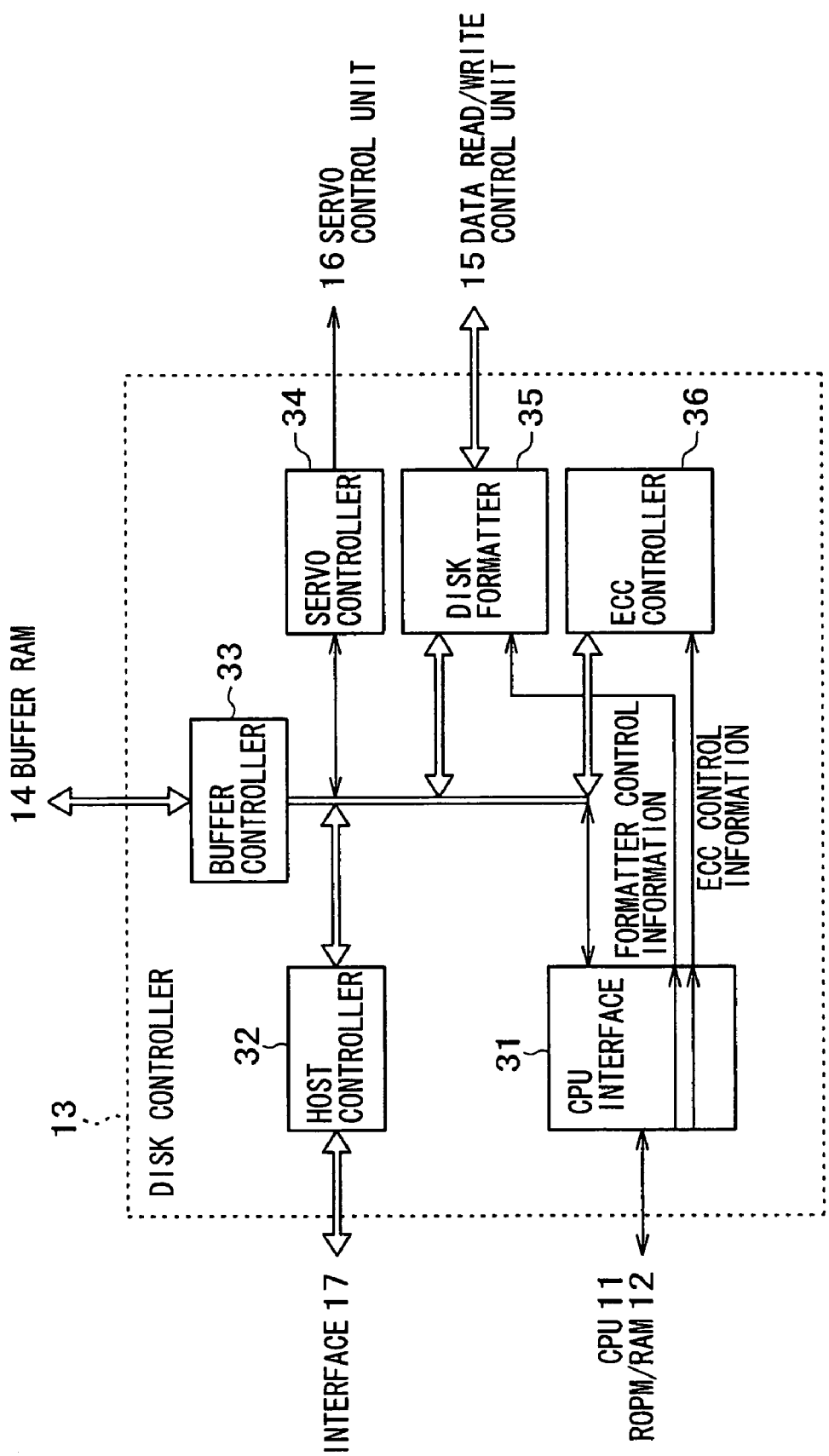
FIG. 2 is a block diagram of the disk controller in the HDD in the embodiment.

FIG. 2 illustrates the internal configuration of the disk controller 13 in FIG. 1 in more detail. As illustrated in FIG. 2, the disk controller 13 include CPU interface 31, host controller 32, buffer controller 33, servo controller 34, disk formatter 35, and ECC controller 36. In FIG. 2, arrows indicating the directions of the movement of data are represented by double line.

The CPU interface 31 is an interface between the CPU 11 and the RAM/ROM 12, and notifies commands from the host, receives the result of command processing from the CPU 11, and performs the like operations.

The host controller 32 communicates with the host connected through the interface 17.

The buffer controller 33 controls the communication of data between the buffer RAM 14 and the various parts in the disk controller 13.

The servo controller 34 controls the operation of the VCM (Voice Coil Motor) 23 and the SPM (SPindle Motor) 24. Thereby, the controller 34 reads servo information from the servo pattern on the magnetic disk 21, and passes the information to the servo control unit 15.

The disk formatter 35 carries out control for writing data on the buffer RAM 14 to the magnetic disk 21 or for reading data from the magnetic disk 21.

The ECC controller 36 generates ECC codes from data stored in the buffer RAM 14 and adds them during write operation, and corrects errors during read operation.

The disk controller 13 illustrated in FIG. 2 receives formatter control information and ECC control information from the CPU 11.

The disk controller 13 illustrated in FIG. 2 receives formatter control information and ECC change control information according to recording surface/zone/head from the CPU 11.

Recording surface is defined as the disk surface of a disk 21 wherein data can be recorded and reproduced in a HDD unit 10. In case of the constitution based on the disks 21a and 21b (one recording surface in one disk) illustrated in FIG. 1 as an example, two recording surfaces exist. That is, the recording surface of the disk 21a and the recording surface of the disk 21b exist. In the constitution based on the disks 21a and 21b (two recording surfaces in one disk) illustrated in FIG. 2, four recording surfaces exist. That is, the front and back recording surfaces of the disk 21a and the front and back recording surfaces of the disk 21b exist.

Zone refers to each zone established when the recording surface is constituted by the ZBR method.

Head refers to each read-write head 22 provided in correspondence with each recording surface.

With respect to access method, in this example, access may be made based on so-called LBA (Logical Block Address) or may made using relative addresses on a track-by-track basis as described later.

If access is made by LBA, the formatter control information is format information for accessing a sector specified by LBA after it becomes accessible on the sought track. This information is transmitted to the disk formatter 35 through the CPU interface 31, and data formatter is generated thereat.

The ECC control information is information for setting the constitution of ECC blocks having first error correcting codes C1 and second error correcting codes C2. For example, if the ECC block constitution is varied from zone to zone according to the number of sectors, the ECC control information functions as information which indicates the constitution. This information is transmitted to the ECC controller 36 through the CPU interface 31, and the ECC block constitution is set there. Then, the buffer RAM 14 is accessed to perform predetermined ECC processing.

If access is made using relative addresses on a track-by-track basis, the above formatter control information is format information for starting access at the leading sector after it becomes accessible on the sought track and accessing sectors equivalent to one track. This information is transmitted to the disk formatter 35 through the CPU interface 31, and data formatter is generated thereat.

The ECC control information is information for setting the constitution of ECC blocks which are completed by track. For example, if the ECC block constitution is varied from zone to zone according to the number of sectors, the ECC control information functions as information which indicates he constitution. This information is transmitted to the ECC controller 36 through the CPU interface 31, and the ECC block constitution is set there. Then, the buffer RAM 14 is accessed to perform predetermined ECC processing.

These control information (formatter control information, ECC change control information) may be placed in any other location than the ROM/RAM pertaining to the CPU 11 in FIG. 1. For example, such information may be stored on a magnetic disk 21, and may be read from the magnetic disk 21 and placed in the buffer RAM 14 at start. In this case, control information can be transmitted from the buffer RAM 14 to various parts.

The HDD 10 in this embodiment is constituted as mentioned above. With this constitution, data access control is carried out without rotational delay, the access time is shortened, and a system wherein high data transfer rate is attained is implemented, as described below. Further, a wide range of random errors and burst errors are made correctable, and thereby retry operation is avoided and lowering of transfer rate is reduced. Thus, stable data reproduction is carried out. Further, measures are taken so that the sector immediately after seek is the sector having the second error correcting code (C2) recorded therein in the accessed track. Thus, the harmful effect of a disturbance and the like is reduced.

2. Servo Area

Figure 4:
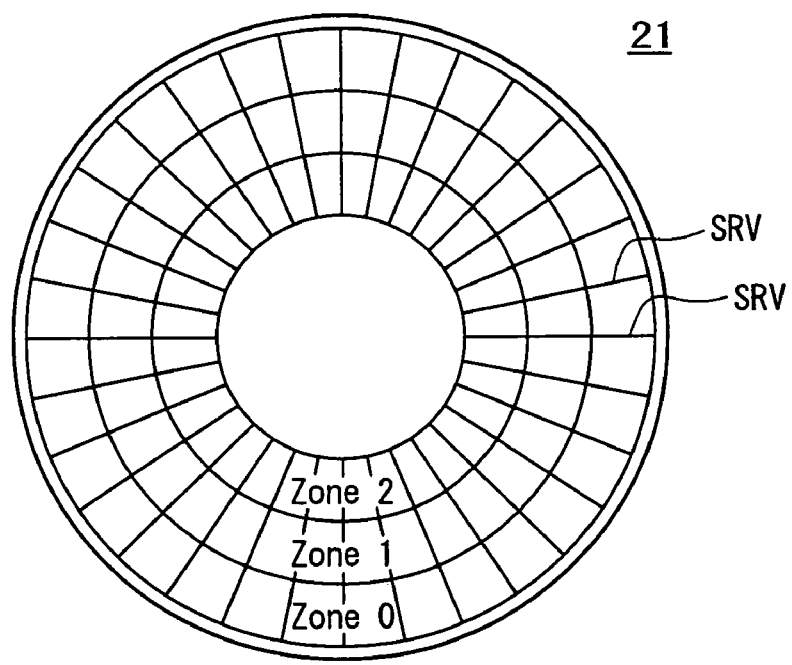
FIG. 4 is an explanatory drawing of servo areas on the disk in the embodiment.

FIG. 4 illustrates an example of the disposition of servo areas in the magnetic disk 21.

In FIG. 4, solid lines in the radial direction indicate servo areas SRV (not the partitions of sectors illustrated in FIG. 3).

In the example illustrated in FIG. 4, servo areas are radially disposed on the magnetic disk 21, as indicated by 32 solid lines drawn in the radial direction. That is, the servo areas SRV are formed regardless of Zones 0, 1, and 2 which form concentric circles. In other words, 32 servo areas SRV are formed on each track in any zone. The constitution that 32 servo areas SRV are provided for each track is nothing but an example for the purpose of explanation.

If each sector is composed of 512 bytes, the size per sector (sector size) is small as compared with the capacity between two servo areas on the track. Therefore, a number of sectors are disposed between some servo area and the next servo area on the track.

The disposition of these sectors is specified mainly with respect to each zone in ZBR. That is, if the zone differs, the number of sectors disposed between one servo area and the next servo area differs as well.

With respect to the relation between zones, the concrete number of sectors is determined so that the linear recording density will be within a predetermined range and the memory capacity per disk will be increased. This is accomplished by making constant the number of revolutions of the spindle motor 24, varying read-write clock, and taking the other like measures.

In the example in FIG. 4, the number of servo areas per track is set to 32. If the number of servo areas is set to 96, for example, the servo areas are similarly disposed on the disk in a radial pattern. Further, a number of sectors are disposed between a given servo area and the next servo area.

The servo band is determined by the number of servo areas per track, the number of disk revolutions, servo frequency, and the like, and is set in accordance with system demand.

In the servo area SRV, for example, track positioning control is carried out. When the magnetic head 22 tracing a track passes a servo area SRV, information indicating whether the head gets on track or out of track is obtained.

Here, it is assumed that a disturbance, such as vibration, is applied while data is being read, and the head deviates from the track position. If the head is significantly shifted from the track at this time, the entire servo control is carried out from the beginning. That is, the data read operation is interrupted, and the relevant track is accessed again to read require data.

3. Access Operation

As mentioned above, the following access methods are possible: access method based on LBA, and access method wherein relative addresses are used on a track-by-track basis. Usually, the access method based on LBA is adopted in a lot of HDDs, and thus the detailed description thereof will be omitted. Here, the access method wherein relative addresses are used on a track-by-track basis will be described.

In case of this access method, sectors equivalent to one track are accessed starting with the sector where the magnetic head 22 got on track in the HDD (Hard Disk Drive) 10. The sector number on the same track is not fixed, and can be given based on relative position.

Thus, access can be started at any sector on one track. That is, access is made on a track-by-track basis, and thereby the necessity for processing involving an uncertain element of look ahead is obviated. Thus, the timing with which seek operation is started can be determined with reliability.

Further, rotational delay is unnecessary because access is started at any sector on one track. Thus, the number of seeks can be minimized and the access time can be shortened.

To write data to a predetermined track, the sectors are provided with relative positions which begins with the sector at which access was started.

To read data, read operation is started with the sector at which access was started, and the read data is arranged on the buffer RAM 14 based on the relative position sector number. For this reason, read operation can be started at any sector.

Figure 5A:
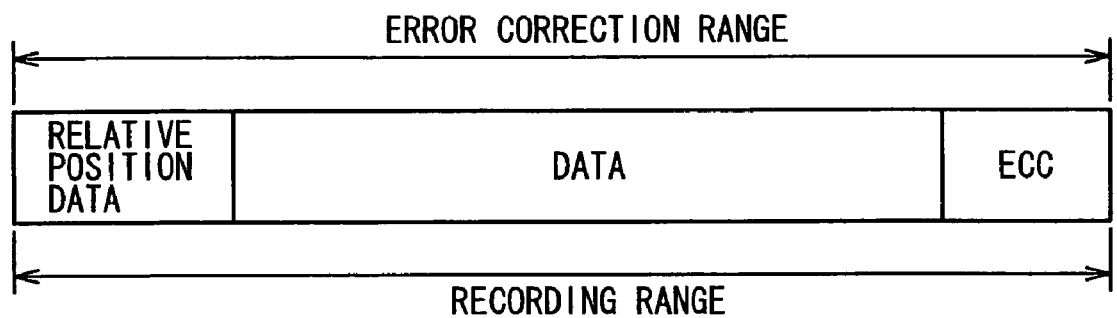
FIGS. 5A and 5B are explanatory drawings of the error correction range in the embodiment.
Figure 5B:
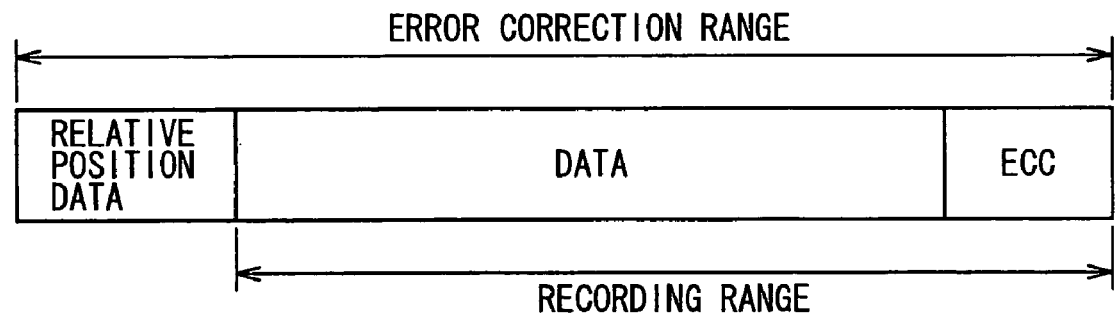

FIGS. 5A and 5B schematically illustrate examples of sector formats used on the tracks on the magnetic disk 21 for implementing the above-mentioned operation.

As illustrated in FIG. 5A, a sector includes: relative position data which indicates the relative position of the sector on the track; the main body of data; and ECC for carrying out error correction with respect to the entire sector region. The whole of them is included in an error correction range and a recording range.

Including of relative position data into the error correction range as a header brings the following advantage: for example, even if a random error occurs in the sector, the relative position data can be restored by error correction. Therefore, smooth disk access operation can be implemented.

In general, a sector has an ID field for recording the address of the sector. In the above-mentioned constitution, recorded is not the absolute position but the relative position, and the size of the ID field can be reduced. Correspondingly, the size of a field available for the main body of data in the sector is increased, with promotes more effective use of the storage area.

When data is written to a track, the relative position which begins with the sector at which access was started is given to sectors, and ECC data including the relative position and data intended to be recorded is generated. Then, the respective data is recorded in the relative position field, data field, and ECC field of the relevant sector. Since write operation is started with the sector at which access was started, the head need not be kept in rotational delay.

When data is read, read operation is started with the sector at which access was started on the track, and the storage position on the buffer RAM 14 is determined based on the sector position obtained from the relative position field. Therefore, even if data read operation is started at any sector, no problem arises: on the buffer RAM 14, the data is rearranged based on the relative position, and thereby the data stored on the track is restored in the original order. Since read operation is started with the sector at which access was started, the head need not be kept in rotational delay.

FIG. 5B illustrates another example of the sector formats used on the track on the magnetic disk 21 in the HDD 10 in this embodiment.

In this case as well as the foregoing, a sector includes: relative position data which indicates the relative position of the sector on the track; the main body of data; and ECC for carrying out error correction with respect to the entire sector region. The whole of them is included in an error correction range. However, unlike the example illustrated in FIG. 5A, the relative position field is not included in the recording range. Thus, the relative position field does not exist, and correspondingly the size of the field available for the main body of data in the sector is further increased, as compared with the above-mentioned example. This promotes more effective use of the storage area.

In this case, when data is written to a track, the relative position which begins with the sector at which access was started is given to sectors, and ECC data including the relative position and data intended to be recorded is generated. Then, only the data intended to be recorded and the ECC data are recorded in the relevant sector. Since write operation is started with the sector at which access was started, the head need not be kept in rotational delay.

When data is read, read operation is started with the sector at which access was started, and error correction is carried out using ECC. Thereby, the relative position which was not written in the sector is regenerated. Then the storage position on the buffer RAM 14 is determined based on the relative position. Therefore, even if data read operation is started at any sector, the data stored on the track is restored in the original order on the buffer RAM 14. Further, since read operation is started with the sector at which access was started, the head need not be kept in rotational delay.

FIG. 5B schematically illustrates another example of the sector formats used on the track on the magnetic disk 21 in the HDD 10 in this embodiment.

In this case as well as the foregoing, a sector includes: relative position data which indicates the relative position of the sector on the track: the main body of data; and ECC for carrying out error correction with respect to the entire sector region. The whole of them is included in an error correction range. However, unlike the example illustrated in FIG. 5A, the relative position field is not included in the recording range. Thus, the relative position field does not exist, and correspondingly the size of the field available for the main body of data in the sector is further increased, as compared with the above-mentioned example. This promotes more effective use of the storage area.

In this case, when data is written to a track, the relative position which begins with the sector at which access was started is given to sectors, and ECC data including the relative position and data intended to be recorded is generated. Then, only the data intended to be recorded and the ECC data are recorded in the relevant sector. Since write operation is started with the sector at which access was started, the head need not be kept in rotational delay.

When data is read, read operation is started with the sector at which access was started, and error correction is carried out using ECC. Thereby, the relative position which was not written in the sector is regenerated. Then the storage position on the buffer RAM 14 is determined based on the relative position. Therefore, even if data read operation is started at any sector, the data stored on the track is restored in the original order on the buffer RAM 14. Further, since read operation is started with the sector at which access was started, the head need not be kept in rotational delay.

Description will be given to an example of communication with the host which takes place when data related to sector format as mentioned above is recorded and reproduced.

An example of communication which takes place when data write operation is performed in the HDD 10 in this embodiment according to a command from the host connected through the interface 17 is as follows:

First, the host issues a command to write data to the HDD 10. In response thereto, the HDD 10 returns an address region where the seek time is minimized based on the present access sequence.

On receipt of the response from the HDD 10, the host transfers data contents whose size (the number of bytes, the number of sectors, etc.) is matched with that of the specified address region. The HDD 10 writes the received data contents on a track-by-track basis.

Here, relative position information is allocated to the individual sectors relative to the first position accessed in write operation on the track. Thus, when issuing a request to write, the host need not consider any specific write location, such as cylinder number, head number, and sector number or specify these items.

The address region the host is notified of by the HDD 10 may be simple. One example is content number for identifying contents with respect to which the host issues a request to write data.

The HDD 10 is provided beforehand with a conversion table which indicates the relation between content numbers and the physical locations of record on the disk 21.

Since disk access is made on a track-by-track basis, the conversion table indicating the relation with content numbers is as illustrated in FIG. 6, for example. That is, track numbers and head numbers are registered into the table in correspondence with content numbers.

Here, attention should be given to that the sector number by CHS is not included in the conversion table. In the above description, relative position information is allocated to the individual sectors relative to the first sector accessed in write operation on the track. With this constitution, data can be rearranged based on the relative position information of each sector regardless of the first sector accessed on the track. For this reason, the access start sector need not be specified in the conversion table.

This conversion table is written into the buffer RAM 14. Writing of the conversion table is carried out by software executed by the disk controller 13 or CPU 11 when data to be written is received from the host.

An example of communication which takes place when data read operation is performed in the HDD 10 in this embodiment according to a command from the host connected through the interface 17 is as follows:

The host issues a command to read data to the HDD 10. In the command to read, a target content number is specified.

Based on the content number, the HDD 10 identifies a target track according to the conversion table in FIG. 6, and causes the magnetic heads 22 to perform seek operation. Then, the HDD 10 transfers data on the disk 21 according to the sequence of the address regions the HDD 10 returned during data write operation.

When issuing a request to read data, the host only has to specify a desired content number, and it need not consider any specific write location (PBA), such as cylinder number, head number, and sector number.

In the HDD 10, as mentioned above, sectors equivalent to one track are accessed, starting with the sector where the magnetic head 22 got on track. Access is made on a track-by-track basis, and thereby the uncertain processing of look ahead can be omitted and the timing with which seek operation is started can be determined with reliability. Further, access can be started at any sector on a track. Therefore, rotational delay can be eliminated by starting read/write operation in any head position immediately after seek operation. As a result, the number of seeks is minimized, and the access time is shortened.

Such disk access operation is implemented by the disk controller 13 instructing the hardware operation of the data read/write control unit 15 and the servo control unit 16 in accordance with the result of the command processing by the CPU 11.

4. ECC Constitution

Where the HDD 10 makes access on a track-by-track basis, as mentioned above, it is appropriate that ECC blocks should be formed on the magnetic disk 21 with one track taken as the basic unit.

If the access method based on LBA is adopted, ECC blocks need not necessarily be formed with one track taken as the basic unit. However, one track may be taken as the basic unit, needless to add.

Here, description will be given to an example of the ECC block on the basis of track.

FIGS. 7A and 7B illustrate examples of the ECC constitution with one track taken as the basic unit.

In the example in FIG. 7A, the magnetic disk 21 is divided into zones, and FIG. 7A illustrates an example of the ECC block constitution in Zone n. That is, like a predetermined Track TK in Zone n, indicated by broken line, each track is taken as the constitutional unit of the ECC block.

The ECC block includes C1 for intra-sector correction and C2 for inter-sector correction.

The error correcting unit (ECC block constitutional unit) including C1+C2 takes one track as the basic unit, and within each track, two or more ECC block constitutional units do not exist.

FIG. 7B illustrates another example of the ECC block. In this case as well, the magnetic disk 21 is divided into zones, and FIG. 7B illustrates an example of the ECC block in Zone m. This example is so constituted that three tracks in Zone m are the constitutional unit of the ECC block. This example is so constituted that an integral multiple of one track is taken as the constitutional unit, and the constitutional unit is not limited to three tracks, needless to add.

In this example as well, the ECC block includes C1 for intra-sector correction and C2 for inter-sector correction. The error correcting unit (ECC block constitutional unit) including C1+C2 takes one track as the basic unit, and within each track, two or more ECC block constitutional units do not exist.

Figure 8:
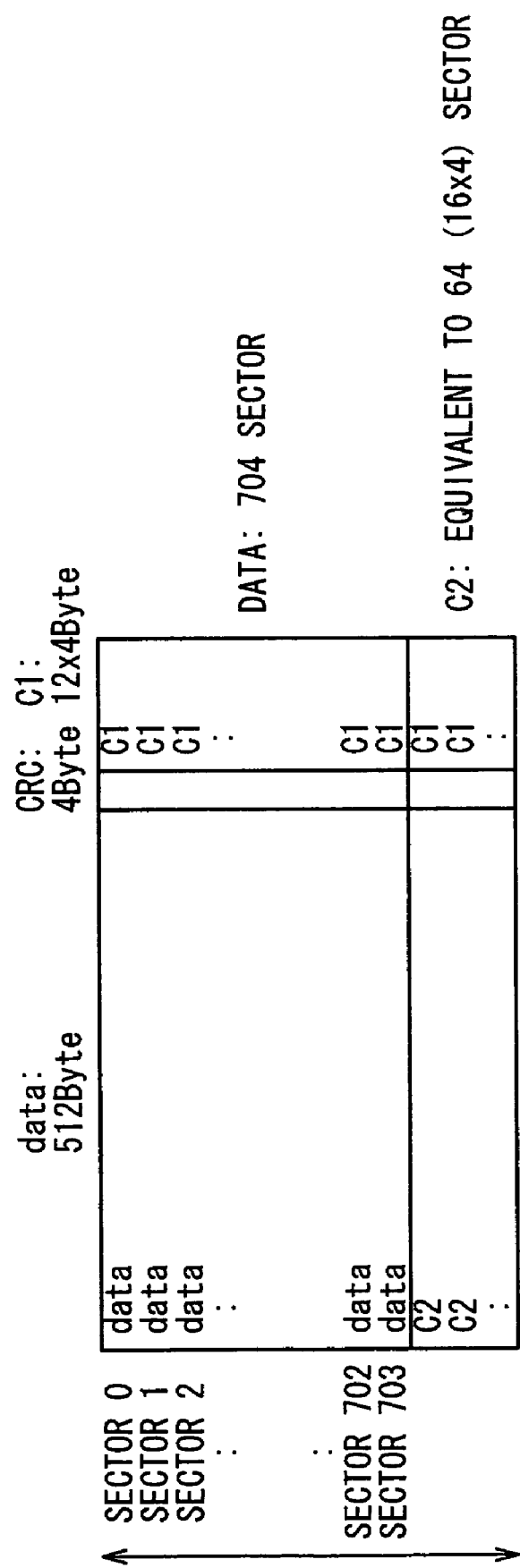
FIG. 8 is an explanatory drawing of the ECC block structure in the embodiment.

FIG. 8 illustrates an example of the ECC block structure of the magnetic disk 21 which adopts the ECC block constitution illustrated in FIGS. 7A and 7B.

Here, Reed-Solomon code with a symbol length of 8 is used as the ECC code.

It is assumed that the effective number of sectors per track in some zone on some magnetic disk is 768 sectors. For example, one sector is constituted of four interleaves wherein a 4-byte CRC (Cross Check Code) and C1 of 48 bytes in total are added to 512-byte data.

In the example of ECC block constitution in FIG. 8, 704 sectors, Sector 0 to Sector 703, are provided as data areas, and 64 sectors, Sector 704 to Sector 767, are provided as C2 areas. C2 is constituted of, for example, four interleaves, each having 16 sectors.

With this constitution, the total number of sectors in one ECC block is 768 sectors, which is equivalent to one track in this zone, and thus the basis of track can be implemented.

Consideration will be given to error correcting capability in this example.

With respect to random error, errors with a length of up to 24 bytes per sector (up to 48 bytes if byte loss information is obtained) can be corrected by utilizing C1.

Further, with respect to burst error, errors with a length of up to 32 sectors per track (up to 64 sectors if the result of CRC is utilized) can be corrected by utilizing C2.

If a predetermined number of sectors, rather than a track-by-track basis, are taken as an ECC block, that can be similarly described.

In this case, a small constitutional unit of the ECC block can be adopted. For example, the ECC block may be constituted of 192 sectors (=176 sectors of data+16 sectors of C2).

Here, description will be given to the reason that the above-mentioned error correcting block is adopted.

In the great majority of conventional HDD systems, error correction is carried out only by sector which includes 512-byte data and information bits.

Therefore, while random errors which occur in each sector can be corrected, random errors which exceed a correctable range or burst errors, that is, errors which last long across sectors cannot be corrected.

In this case, the frequency of the occurrence of read error can be reduced to a certain level or below and error correction can be carried out, for example, by performing retry operation. However, one time of retry operation basically corresponds to increase in access time equivalent to one track.

If retry operation takes place, the access time is eventually increased even though the access time has been shortened by making access on a track-by-track basis, as mentioned above. This results in delay in data read time.

In case AV contents are handled in, for example, reproduction with HD (High Definition) picture quality or special reproduction, a high transfer rate is required. Even if an uncorrectable read error occurs at this time, retry operation cannot be performed sometime because of temporal restriction. In such a case, under the existing circumstances, processing is proceeded with without correcting the read error. As a result, the reproduction quality is degraded.

To cope with this, ECC is constituted as mentioned above. Thereby, stable data reproduction is carried out, and the frequency of the occurrence of cases where an error is uncorrectable and thus retry must be carried out is reduced.

That is, C2 correction wherein inter-sector errors can be corrected is added to C1 correction which is conventional sector-by-sector error correction. Further, the error correcting unit (ECC block) including C1+C2 is so constituted that it is completed within, for example, one track.

If the ECC block unit including C1+C2 is completed within one track, access can be made on a track-by-track basis, and thus, data access control free from rotational delay can be implemented. That is, the time required to access a desired data storage location can be shortened. Further, such a constitution that two or more ECC blocks do not exist on one track can be adopted. Thus, data access control free from rotational delay can be similarly implemented even if ECC is constituted by a plurality of tracks.

In the Reed-Solomon code with a symbol length of 8, illustrated in FIG. 8, interleave can be applied to 512-byte data.

Figure 9:
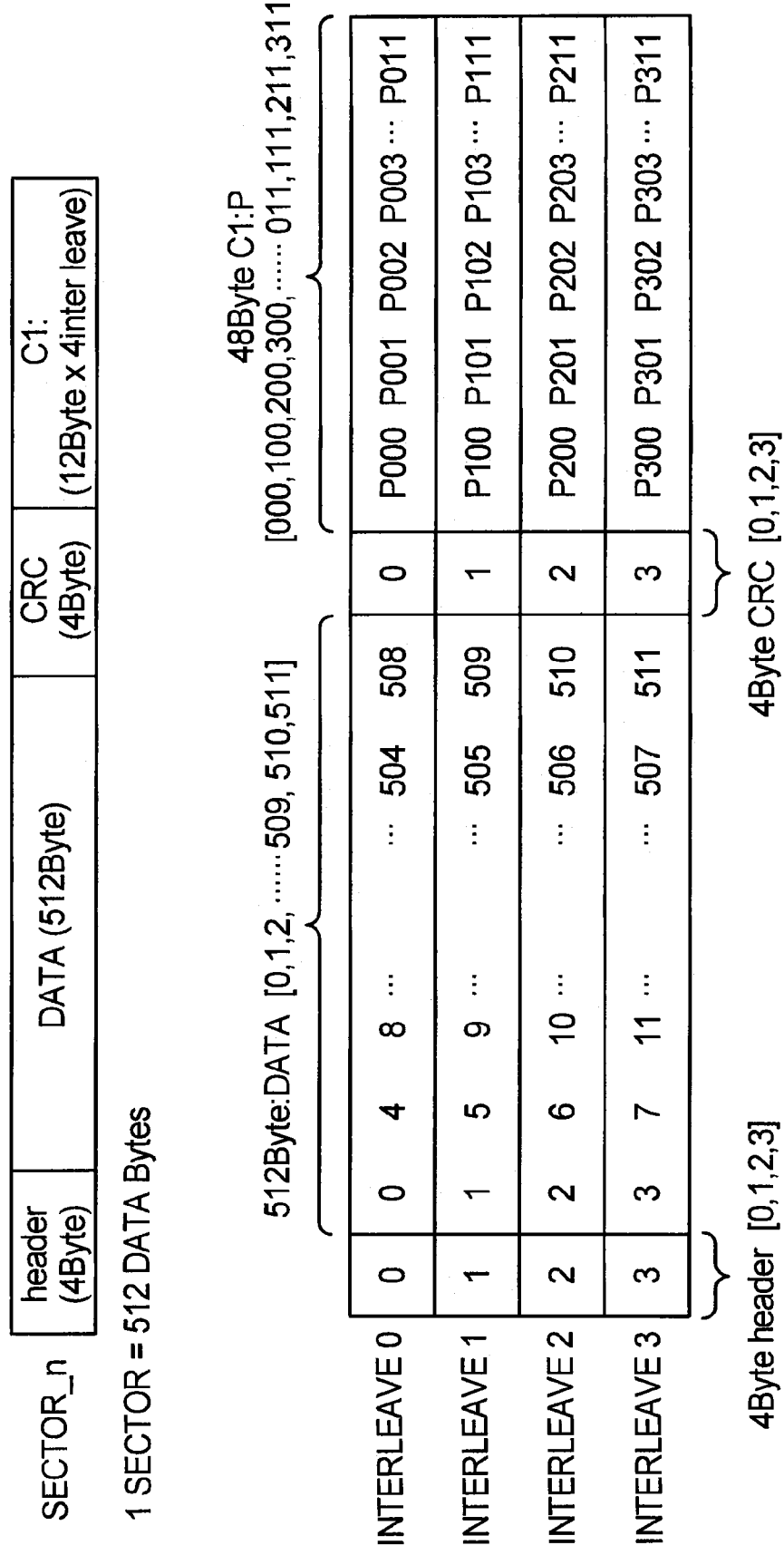
FIG. 9 is an explanatory drawing of the interleaved structure in the embodiment.

FIG. 9 and FIG. 10 illustrate examples wherein interleave is applied to the ECC block constitution in this embodiment.

In the examples in FIG. 9 and FIG. 10, interleave is applied to Sector n. One sector is constituted of 4-byte header, 512-byte data, and 4-byte CRC, and the total is divided into four. Then, each divided unit is provided with 12-byte ECC code C1.

For example, Interleave 0 is constituted by adding 12-byte parity to 1-byte header, 128-byte data, and 1-byte CRC. This is the same with Interleaves 2, 3, and 4.

Then, the interleaves are disposed within the sector as follows: Interleave 0 is placed in the 0th place; Interleave 1 is placed in the 1st place; Interleave 2 is placed in the 2nd place; Interleave 3 is placed in the 3rd place; Interleave 4 is placed back in the 0th place again, and so on.

The 4-byte header, 512-byte data, 4-byte CRC suffixed to them, and C1 code subsequently created are similarly arranged in sequence.

FIG. 9 illustrates the sector broken down by interleave, and FIG. 10 illustrates the disposition of the above items on memory with addresses 0 to 567 assigned to them.

Thus, FIG. 9 and FIG. 10 indicates the same sector unit as illustrated in FIG. 8. That is, 4-byte header, 512-byte data, 4-byte CRC, and ECC code C1, 48 bytes in total, added to them constitute one sector. These items are constituted as major parts of a recording sector on the magnetic disk 21.

In the actual constitution of recorded data, preamble, synchronizing signal, postamble, and the like are further added. Other constitutions of the sector unit also are possible. For example, a format without header file and a format without CRC can be adopted.

These constitutions of interleave can be determined mainly according to hardware configuration. In the Reed-Solomon code with a symbol length of 8, for example, the interleave constitution is applied in the direction of C1 (i.e., the direction of sector), as illustrated in FIG. 9.

The above-mentioned interleave may be applied to C2 wherein ECC is implemented between sectors. In this case as well, the similar constitution and action can be implemented. This is done by substituting sector for Byte in the DATA division in FIG. 9 and arranging interleaves in the direction of C2 (i.e. the direction orthogonal to that of sectors).

In this example, 512 byte is taken as the size of data one sector accommodates. However, the number of sectors is not limited to this. For example, if 1024 byte or 2048 byte is taken as the size of data one sector accommodates, ECC blocks constituted in each sector and across sectors can be implemented similarly with the foregoing.

If ECC blocks are completed by track, a problem arises. When the zone on the magnetic disk 21 differs, the number of sectors per track differs. Therefore, with a constitution with the same number of ECC parities, the error correcting capability can greatly differ from zone to zone.

To cope with this, the ECC block constitution is varied from zone to zone. Thus, the redundancy of error correcting code can be contained within a certain range. As a result, the similarly high error correcting capability can be maintained throughout the entire circumference of the disk.

In case of the example in FIG. 3, the number of sectors per track is 64 sectors in Zone 0, 32 sectors in Zone 1, and 16 sectors in Zone 2. The number of revolutions is identical between zones, but the operation clock is varied to keep the linear recording density in each zone within a certain range.

With respect to ECC at this time, C1 is added to each sector. The constitution of C1 is fixed and identical. More specifically, C1 is constituted as in FIG. 8, for example.

Then, C2 is constituted as follows: in Zone 0, 8 sectors of 64 sectors are provided as C2 parities; in Zone 1, 4 sectors of 32 sectors are provided as C2 parities; and in Zone 2, 2 sectors of 16 sectors are provided as C2 parities.

With this constitution, the ratio of the number of C2 parity sectors to the number of data sectors per track is constant between zones, and C2 correcting capability can also be made identical between zones.

In actual format, divisible values are hardly obtained as in the relation between zone and the number of sectors. Therefore, setting can be made so that the redundancy of the ECC portion is within a certain range.

As mentioned above, ECC blocks are completed by track and are constituted of C1+C2, and further interleaved structure is adopted. In addition, the ECC constitution is made variable from zone to zone, and the redundancy of the ECC portion is controlled within a predetermined range. Thus, a wider range of random errors and burst errors can be corrected throughout the entire circumference of the disk, and stable data reproduction is implemented.

In this example, the C1 portion of the ECC constitution is fixed, and the C2 portion is variable. Thereby, the redundancy of the ECC portion, that is, the error correcting capability is controlled within a predetermined range. However, other constitutions may be adopted. For example, the C1 portion may be variable from zone to zone, and the C2 portion may be fixed to control the error correcting capability within a predetermined range. Or, C1 and C2 are comprehensively controlled to control the error correcting capability within a predetermined range.

5. Setting of ECC Block Wherein Sector Immediately After Seek is Taken as C2 Sector.

The ECC block structure is basically as described above. In this embodiment, with respect to the disposition of sectors on the track, the ECC block is further constituted so that the following takes place: the sector with which access is started immediately after a track is sought is a C2 sector.

Such an ECC block constitution will be described with respect to two cases: case where the LBA access method is adopted, and case where the above-mentioned access method based on track-by-track relative address.

First, referring to FIG. 11 and FIG. 12, description will be given to the case of the LBA access method.

Figure 11:
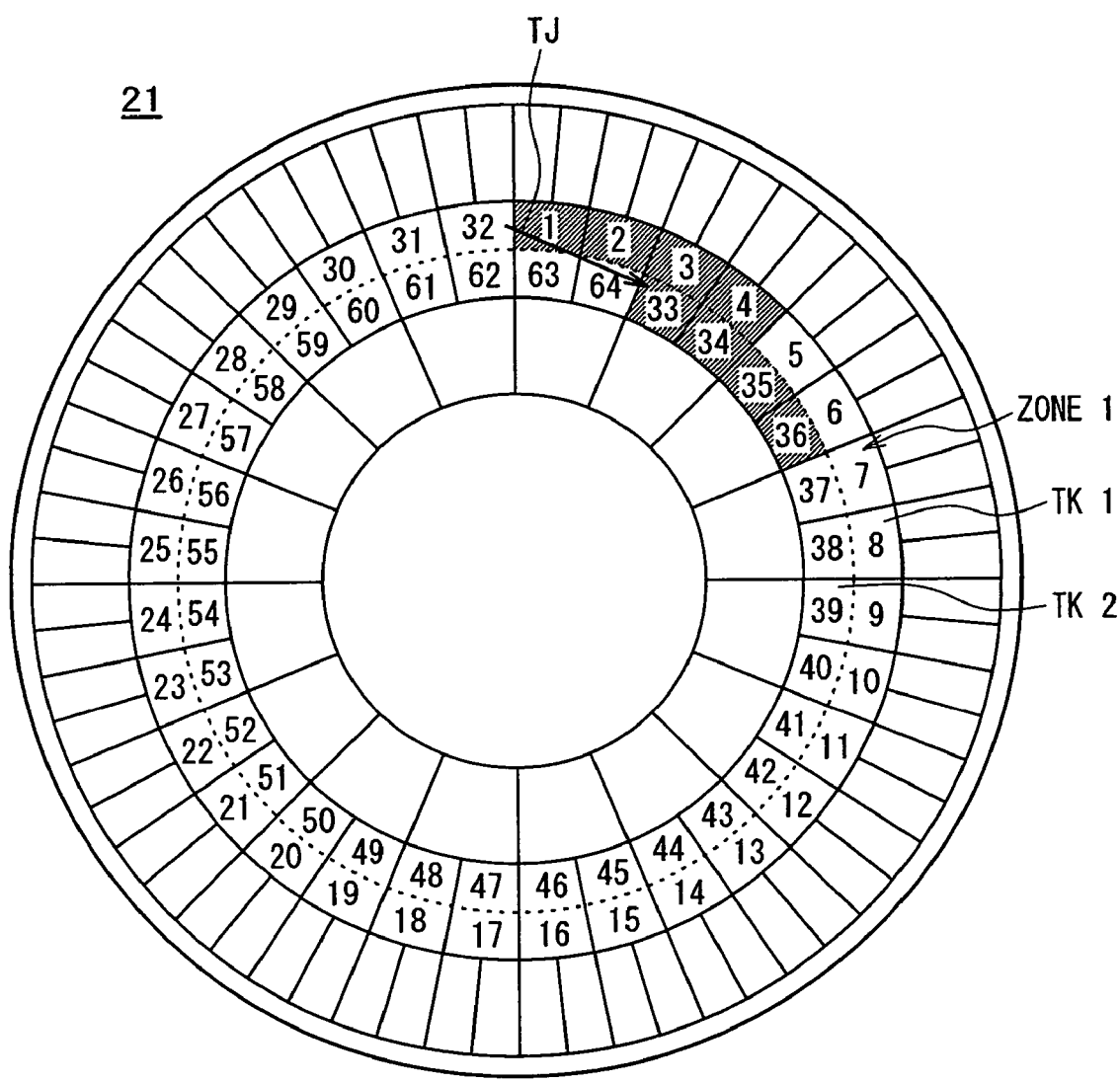
FIG. 11 is an explanatory drawing illustrating an example of the disposition of C2 sectors by the LBA access method in the embodiment.

FIG. 11 illustrates the disposition of sectors in this embodiment in detail. In this case, the unit of accessing is not limited to track and LBA is assigned to each sector.

FIG. 11 schematically illustrates the disposition of sectors on two tracks in Zone 1 which is positioned at the middle radius of a disk 21 having Zones 0, 1, and 2 as illustrated in FIG. 3. As mentioned above, each track in Zone 1 has 32 sectors.

As illustrated in FIG. 11, as LBA, numbers of "1" to "64" are assigned in sequence to the sectors on the two tracks (TK1, TK2) included in Zone 1. These numerical values of "1" to "64" are for the purpose of explanation, and in reality values as LBA are used. The LBA is values continuously assigned to the sectors from the outer radius side to the inner radius side throughout the entire circumference of the disk.

In some track TK1 in Zone 1, LBA numbers of "1" to "32" are assigned to the sectors. In the next track TK2, LBA numbers of "33" to "64" are assigned to the sectors. In this case, the position of the leading sector "1" in Track TK1 and the position of the leading sector "33" in Track TK2 are shifted from each other by an amount equivalent to a track skew determined by the number of revolutions and information on servo area and the like.

The track skew is given as follows: a number of servo areas are radially disposed on the disk, and the area between a servo area and the next servo area is taken as a frame. The track skew is given on a servo frame-by-servo frame basis. As mentioned above, the position of the leading sector is shifted from track to track. This is because the following are taken into account: the time required for the head to make a track jump, as indicated by arrow TJ, to seek the next track, and the rotation of the disk.

Access to Track TK1 is made with respect to Sectors "1" to "32," and subsequently the head moves to Track TK2. Since the positions of the leading sectors are shifted by an amount equivalent to track skew, as mentioned above, the wait time after seek can be reduced, and the head can start access at Sector "33."

In access during read operation according to LBA, the head moves from LBA "1" to LBA "32" on Track TK1 in FIG. 11, and after seeking Track TK2, the head moves from LBA "33" to LBA "64."

In this case, each track is constituted as ECC block, and of 32 sectors on each track in Zone 1, 28 sectors are allocated for data sectors and 4 sectors are allocated for C2 sectors.

In FIG. 11, LBA "1" to LBA "4" are provided as C2 sectors on Track TK1, and LBA "33" to LBA "36" are provided as C2 sectors on the adjacent Track TK2.

This is equivalent to the following: with such an ECC block constitution as illustrated in FIG. 8, the C2 sectors are disposed at the head of the ECC blocks for recording and reproducing data. FIG. 12 illustrates the way this is implemented.

Figure 12:
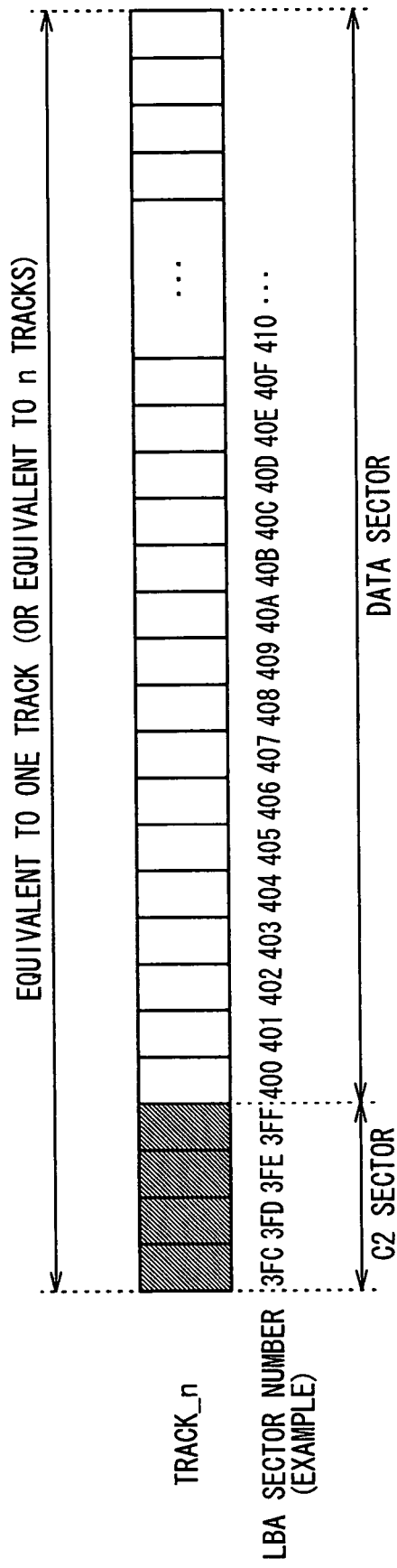
FIG. 12 is an explanatory drawing illustrating an example of the ECC block constitution in the embodiment.

FIG. 12 illustrates sectors which constitute an ECC block equivalent to one track (or n tracks), for example. It shows 32 sectors on one track in Zone 1 in FIG. 11, for example.

In this example, the LBA number from the leading sector begins with "3FC."

In this case, the four leading sectors "3FC" to "3FF" are used as C2 sectors. If LBA "1" on Track TK1 in FIG. 11 is actually "3FC," the ECC block is so formed that the C2 sectors are placed in the four leading sectors as in FIG. 12. Then, when data is written to Track TK1, "1" to "4" become C2 sectors as in FIG. 11.

On the next track TK2 as well, ECC blocks wherein the four leading sectors are taken as C2 sectors, as in FIG. 12, are formed. Then, when data is written, "33" to "36" become C2 sectors as in FIG. 11.

Data for which ECC blocks have been established as mentioned above is written according to LBA. Thus, when the data is read, the C2 sector of the ECC block can be given to the leading sector at which read operation is started immediately after the head gets on track.

Read operation involving seeks is often continuously performed at high speed. Even if a read error occurs in such a case, recovery by retry processing can be difficult to carry out because a predetermined transfer rate must be maintained. The occurrence of read error is more frequent when a disturbance, such as vibration, is applied. The above error often occurs in proximity to areas where read operation is started immediately after the head does a seek and gets on track. One of possible causes is that the positioning of the track is not sufficiently stabilized.

Here, consideration will be given to the following case: read operation immediately after seek is very unstable. Or, read operation is performed immediately after seek under the application of a disturbance. Consequently, a lot of errors occur, and the level of sector error exceeds expectation. As a result, the C2 correcting capability of an established ECC block is exceeded.

If error correction is infeasible, data is outputted as is read without undergoing such processing as error correction. The sector where a lot of errors occur is a sector in proximity to the area in which the head is positioned immediately after read operation is started.

To cope with the above problem, C2 sectors as redundancy sectors are disposed in sector areas in proximity to the area in which the head is positioned immediately after read operation is started. Thus, even if an uncorrectable error occurs, the loss of data due to the error can be reduced.

More specific description will be given. Error correcting blocks are generated so that when the head moves to some track during seek operation, the first sector to be read on that track is a C2 sector before write operation is performed. Thus, the following can be brought about: in read access, the sector at which the head is positioned immediately after read operation is started is a C2 sector as a redundant portion.

More specific description will be given. Error correcting blocks are formed so that a C2 sector is disposed at least at the head of error correcting blocks. Thus, the following can be brought about: in read operation, read access is started at a C2 sector immediately after the head gets on track.

If an error occurs due to a disturbance or the like at this time, a lot of sectors with error are C2 sectors.

Eventually, with respect to sectors which involve error and whose data is outputted without recovery, less influential data can be outputted. This is because the great majority of error sectors are redundancy sectors. Therefore, more stable data reproduction is implemented.

In the examples illustrated in FIG. 11 and FIG. 12, the following measures are taken to obtain a predetermined redundancy level: a predetermined number of C2 sectors (e.g., 4 sectors of 36 sectors) are disposed in a lump at the head of ECC blocks in correspondence with the number of sectors in the ECC block. However, if at least the leading sector is a C2 sector, the above-mentioned desired effect can be obtained.

Figure 13:
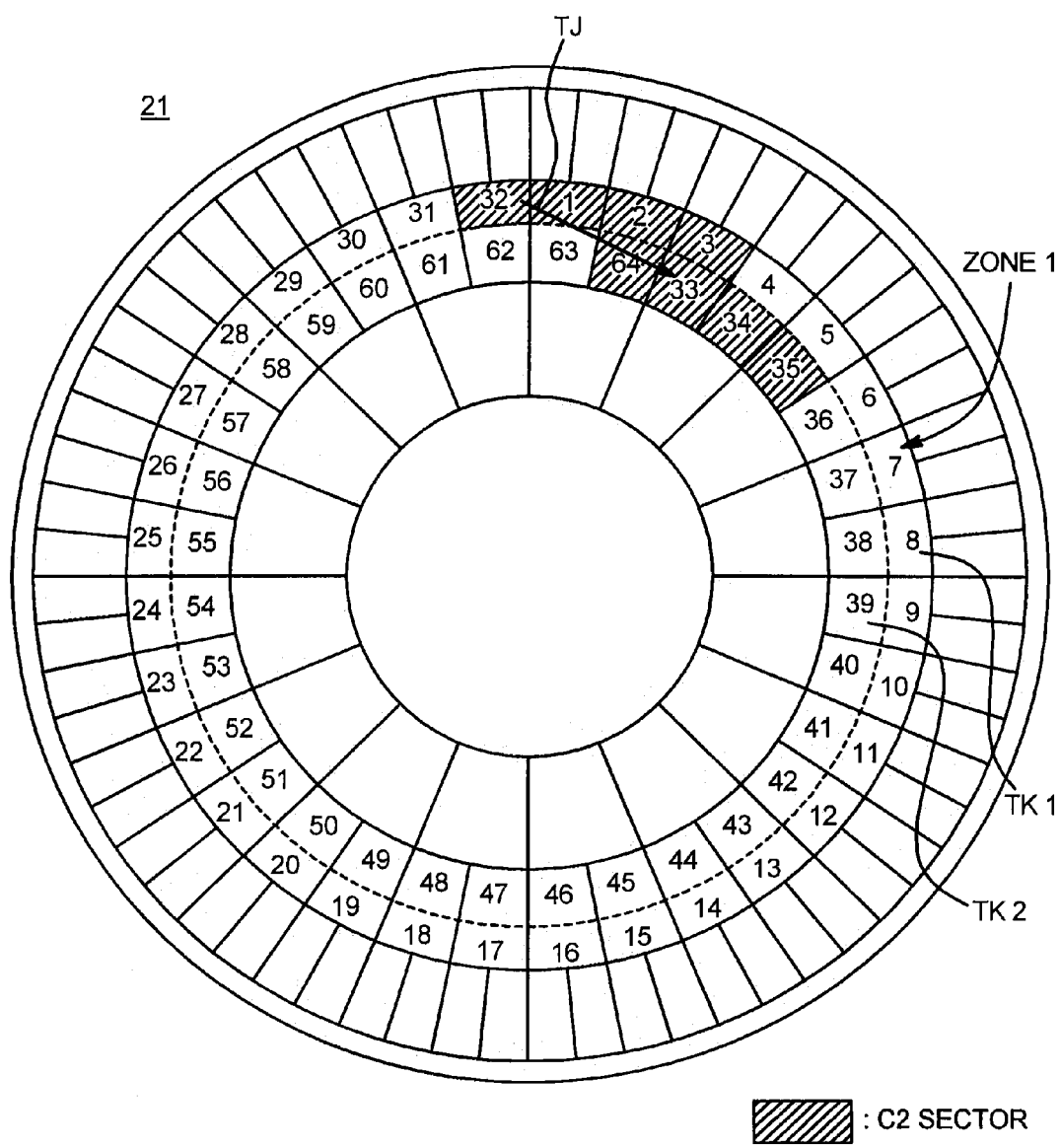
FIG. 13 is an explanatory drawing illustrating another example of the disposition of C2 sectors in the embodiment.

FIG. 13 illustrates an example wherein C2 sectors which are 4 sectors of 36 sector are placed at LBA "1," LBA "2," LBA "3," and LBA "32" on Track TK1, and at LBA "33," LBA "34," LBA "35," and LBA "64" on Track TK2. That is, this is an example wherein the three sectors at the head of the ECC block and one sector at the tail are constituted as C2 sectors.

The ECC block is constituted as mentioned above, and data is written. In this case as well, in subsequent data read operation, a C2 sector of the ECC block constitution is disposed in the leading position in which read operation is started immediately after the head gets on track. Therefore, the same effect as described above is obtained.

Needless to add, as long as the leading sector (the first one or several sectors) is C2 sector, the remaining C2 sectors may be any middle sectors other than the sectors at the head and the tail.

Further, the position in which read operation is actually started immediately after the head gets on track is not at a supposed LBA but in the vicinity of the LBA sometimes. In this case as well, the same effect can be obtained as long as a C2 sector is disposed in the leading position in which read operation is started.

In the example in FIG. 11, the ECC block is constituted on a track-by-track basis. However, the present invention is not limited to this constitution. Even if the ECC block is constituted not on a track-by-track basis but on the basis of any other number of sectors, no problem arises. To cope with this, such a constitution that when the head moves to some track during seek operation, the first sector to be read on that track is a C2 sector can be similarly adopted. Thus, more stable data reproduction is implemented.

Next, referring to FIG. 14 and FIG. 15, description will be given to the case where the access method based on the track-by-track relative address mentioned above is adopted.

Figure 14:
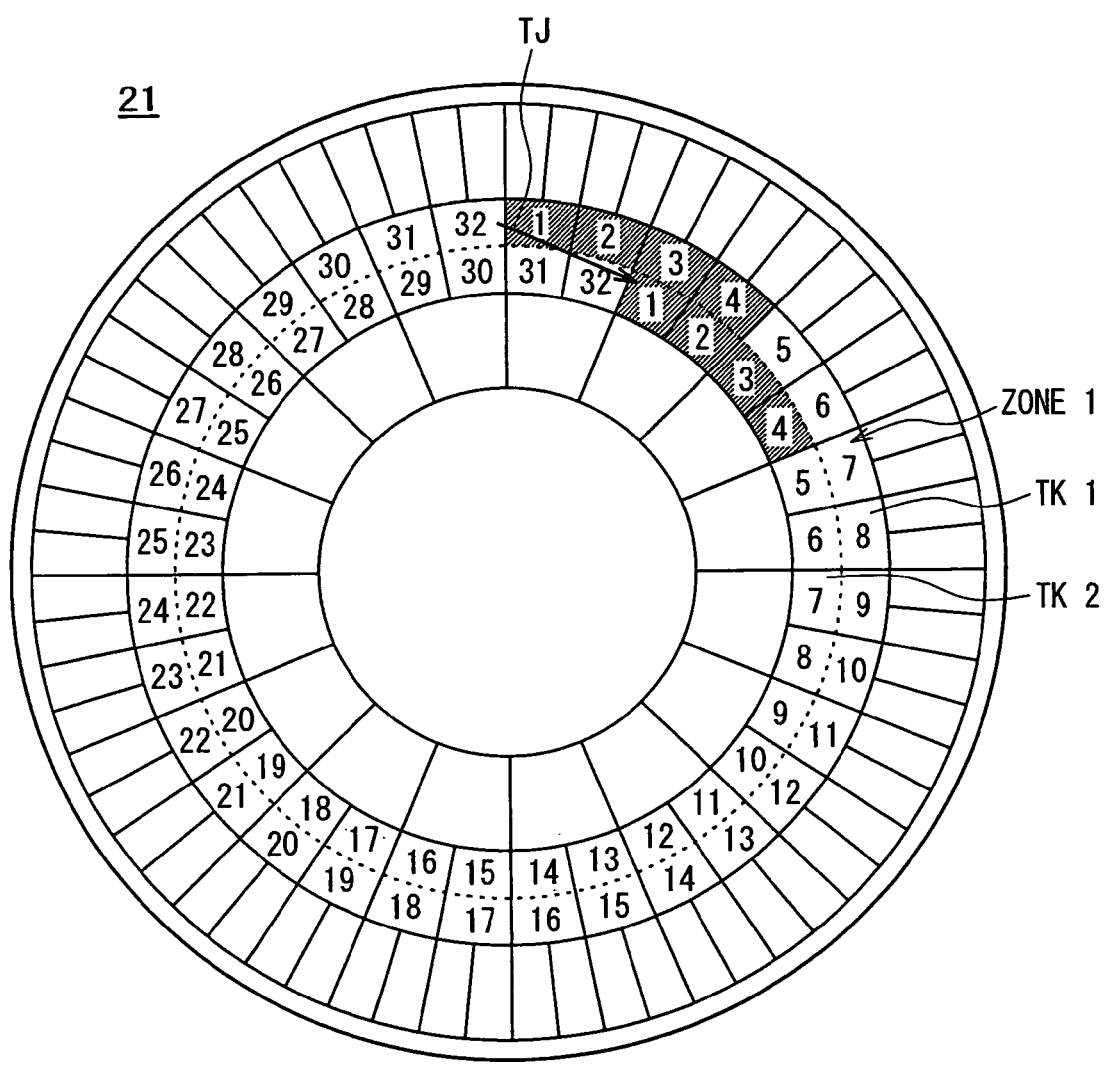
FIG. 14 is an explanatory drawing illustrating an example of the disposition of C2 sectors by the relative address access method in the embodiment.

FIG. 14 illustrates the disposition of sectors in detail. In this case, access is made on a track-by-track basis, and relative addresses are assigned to the sectors as mentioned above.

FIG. 14 schematically illustrates the disposition of sectors on two tracks in Zone 1 as in FIG. 11. Each track in Zone 1 has 32 sectors.

As illustrated in FIG. 14, relative addresses of "1" to "32" are assigned to the sectors on the two tracks (TK1, TK2) included in Zone 1. These relative addresses of "1" to "32" are assigned in sequence when write access is made to each track, and are not fixed with respect to the physical sector locations on the tracks.

For example, the sector at relative address "1" on Track TK1 is the first sector that becomes write accessible when the head seeks Track TK.

If data is continuously written to Tracks TK1 and TK2 in Zone 1, relative addresses of "1" to "32" are assigned to the sectors on track TK1, and relative addresses of "1" to "32" are also assigned to the sectors on Track TK2. In this case, the positional deviation between the leading sector "1" on Track TK1 and the leading sector "1" on Track TK2 is equivalent to the following: the deviation between the position in which the head is located immediately after it does a seek and moves from Track TK1 to Track TK2 (track jump TJ) and the position in which the head is located when access is started. This is not necessarily matched with the above-mentioned track skew which is determined by the number of revolutions and information on servo area and the like.

In access during write operation according to relative addresses, the head moves from relative address "1" to relative address "32" on Track TK1 in FIG. 14, and after seeking Track TK2, the head moves from relative address "1" to relative address "32" on Track TK2.

In this case, each track is constituted as ECC block, and of 32 sectors on each track in Zone 1, 28 sectors are allocated for data sectors and 4 sectors are allocated for C2 sectors.

In FIG. 14, relative address "1" to relative address "4" are provided as C2 sectors on Track TK1, and relative address "1" to relative address "4" are provided as C2 sectors also on the next track TK2.

This is equivalent to the following: with such an ECC block constitution as illustrated in FIG. 8, the C2 sectors are disposed at the head of the ECC blocks for recording and reproducing data. FIG. 15 illustrates the way this is implemented.

Figure 15:
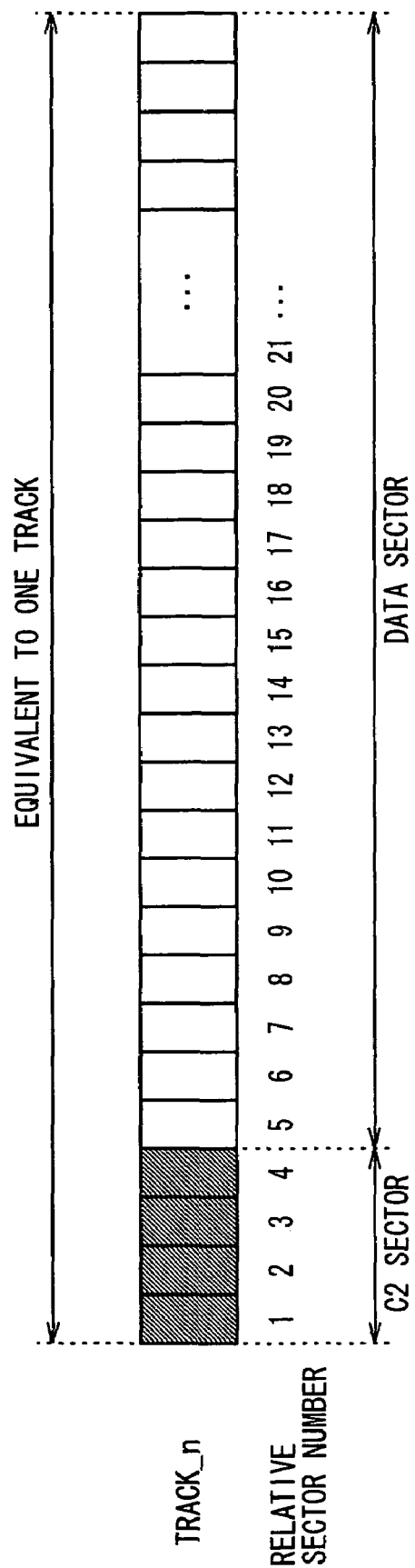
FIG. 15 is an explanatory drawing illustrating an example of the ECC block constitution in the embodiment.

FIG. 15 illustrates sectors which constitute an ECC block equivalent to one track, for example. It shows 32 sectors on one track in Zone 1 in FIG. 14, for example.

Then, as illustrated in FIG. 15, the ECC block is so formed that the four leading sectors whose relative addresses are "1" to "4" are disposed as C2 sectors. The ECC blocks are constituted as mentioned above, and data is written to Tracks TK1 and TK2 in sequence. Thus, the sectors which are positioned at the head of each track and at relative addresses "1" to "4" become C2 sectors as in FIG. 14.

Error correcting blocks are generated so that when the head moves to some track during seek operation, the first sector to be read on that track is a C2 sector before write operation is performed. Thus, the following can be brought about: in read access, the sector at which the head is positioned immediately after read operation is started is a C2 sector as a redundant portion.

Error correcting blocks are formed so that a C2 sector is disposed at least at the head of error correcting blocks. Thus, the following can be brought about: in read operation, read access is started at a C2 sector immediately after the head gets on track.

Thus, with respect to sectors which involve error and whose data is outputted without recovery, less influential data can be outputted. Therefore, more stable data reproduction is implemented as in the examples described referring to FIG. 11 and FIG. 12.

In case of the access method based on relative address, in read operation, the sector at which the head is positioned immediately after it gets on track is not necessarily a C2 sector even if the sectors at relative addresses "1" to "4" on each track are C2 sectors as in FIG. 14.

For this reason, if an ECC block is constituted with respect to each track and data is written to a number of tracks in one time of continuous write access, a problem arises: when read operation is performed with respect to a number of the tracks, the operation must be controlled so that the following takes place: with respect to the second track (Track TK2 in this case) and the following tracks of a number of the tracks, the sector at which read operation is started immediately after the head gets on track is a C2 sector. This will be described below.

In access based on relative address, as mentioned above, write/read operation may be started at any sector on one track. In write operation, relative addresses are assigned, starting with the sector which has become write accessible; therefore, write operation can be started at any sector. In read operation, read sector data equivalent to one track only has to be rearranged on the buffer RAM 14 according to relative addresses; therefore, read operation can be started at any sector.

That is, access can be started at any sector on a track; therefore, rotational delay can be eliminated by starting read/write operation in any head position immediately after seek. This has been already described above.

As such, read operation need not necessarily be started at a sector at relative address "1."

Now, consideration will be given to a case where Track TK1 in FIG. 14 is sought first. Whatever the relative address of a sector which becomes read accessible after the head gets on track, read access can be made to sectors equivalent to one track, starting with the sector. For example, if the head position immediately after seek is the sector at relative address "15," sectors at relative addresses "15," "16," . . . "32," "1," "2," . . . "14" can be accessed in this order. Thus, rotational delay is eliminated.

Then, to the next track TK2, the head can do a seek and move immediately after data in Sector "14" is read. In this case, however, the head gets on track in the vicinity to Sector "14" on Track TK2. That is, the first sector to be read immediately after the head gets on track is not C2 sector (any of Sectors "1" to "4"). As a result, the above-mentioned effect against disturbance and the like is not obtained.

To cope with this, on the first track, the head is kept in rotational delay as required, and then either of the following measures is taken: <1> read access is started at a sector at relative address "1," or <2> read access is made with respect to sectors equivalent to one track, and when the head arrives at relative address "32," the head is caused to do a seek and move to the next track.

If read access is started at a sector at relative address "1," as described under <1> above, the following measures are taken: the head is caused to seek Track TK1, for example, and get on track. Thereafter, the head is kept in rotational delay as required. When the head arrives at the sector at relative address "1," read operation is started. Then, when read operation has been performed with respect to the sectors at relative addresses "1" to "32" equivalent to one track, the head is caused to do a seek and move to the next track TK2. Thus, read operation is started in the vicinity of the sector at relative address "1" on Track TK2 as well. Therefore, the first sector to be read immediately after seek can be made to be a C2 sector.

This is the same with cases where other tracks TK3, TK4, . . . (not shown in FIG. 14) are uninterruptedly read. That is, the first sector to be read immediately after seek can be made to be a C2 sector.

In this case, Tracks TK3, TK4, . . . are tracks to which write access is made in a series of operations lasting from Track TK1. In case of the access method based on relative address, read operation may be performed, starting at any sector at which the head is positioned immediately after seek. However, if data is written to tracks in successive write access operation, the positions of the leading Sectors "1" are shifted by an amount equivalent to seek operation (track jump TJ) without exception, like Tracks TK1 and TK2 above. That is, if seek operation is performed immediately after Sector "32" is accessed, read operation can be started in the vicinity of Sector "1" on the next track.

The method under <2> above is such that: read access is made with respect to sectors equivalent to one track, and when the head arrives at relative address "32," the head is caused to do a seek and move to the next track. This method will be described in more detail. Immediately after the head is caused to seek Track TK1, for example, and get on track, sectors equivalent to one track are read without rotational delay. After the sectors equivalent to one track have been read, the head is kept in rotational delay as required. When the head arrives at relative address "32," the head is caused to do a seek and move to the next track TK2. In this case, read operation is started in the vicinity of the sector at relative address "1" on Track TK2. Therefore, the first sector to be read immediately after seek can be made to be a C2 sector. Then, read operation is performed with respect to relative addresses "1" to "32" on Track TK2, and thereafter the head is caused to do a seek and move to the next track TK3. Therefore, the same operation as mentioned above also takes place on Track TK3.

If the access method based on relative address is adopted, read access can be started at any sector at which the head is positioned immediately after seek, as mentioned above. This embodiment is constituted so that only on the first track, read operation is started at relative address "1" or after sectors equivalent to one track have been read, the head is caused to wait until relative address "32" comes and then do a seek. Thus, on the next track TK2 and the subsequent tracks, read operation is started at a C2 sector immediately after seek.

The first track referred to here is the track positioned in the first place when a predetermined plural number of tracks are taken as one unit. For example, a predetermined number of tracks wherein data is uninterruptedly recorded and reproduced and the track skew arising from seek is constant are taken as one unit.

Though the advantage of the access method based on relative address of elimination of rotational delay during read operation is partly limited, the above-mentioned constitution still brings the advantage of obviation of necessity for rotational delay in write access. As an example, it is assumed that data is written to Tracks TK1 and TK2 above. In this case, rotational delay is required when the head gets on Track TK1 in the LBA access method. In the access method based on relative address, meanwhile, write operation can be started with any sector at which the head is positioned immediately after it got on Track TK1 taken as relative address "1."

In the examples illustrated in FIG. 14 and FIG. 15, the following measures are taken to obtain a predestined redundancy level: a predetermined number of C2 sectors (e.g. 4 sectors of 36 sectors) are disposed in a lump at the head of ECC blocks in correspondence with the number of sectors in the ECC block. However, if at least the leading sector is a C2 sector, the above-mentioned desired effect can be obtained.

That is, C2 sectors may be provided at relative addresses "1," "2," "3," and "32" on each track. The ECC blocks are constituted as mentioned above, and data is written. In this case as well, in subsequent data read operation, a C2 sector of the ECC block constitution is disposed in the leading position in which read operation is started immediately after the head gets on track. Therefore, the same effect as described above is obtained.

Needless to add, as long as at least the leading sector (the first one or several sectors) is C2 sector, the remaining C2 sectors may be any middle sectors other than the sectors at the head and the tail.

Further, the position in which read operation is actually started immediately after the head gets on track is not as expected but in the vicinity of the expected position sometimes. In this case as well, the same effect can be obtained as long as a C2 sector is disposed in the leading position in which read operation is started.

In the example in FIG. 14, the ECC block is constituted on a track-by-track basis. However, the present invention is not limited to this constitution, and the ECC block may be constituted on the basis of n tracks. In this case, however, the tracks are separated into units by sectors equivalent to one track (separated by 32 sectors in case of the example in FIG. 14, for example). Then, a C2 sector is placed at the head of each unit. That is, in the ECC block constitution, the leading sector of a number of sectors equivalent to one track is each taken as a C2 sector, as in FIG. 15.

The HDD 10 in this embodiment is constituted as follows and thus capable of more stably reproducing data: ECC blocks are formed and disposed so that the first sector to be read on a track immediately after seek, that is, a sector wherein error is prone to occur due to a disturbance is a C2 sector. Thus, even if an error uncorrectable by C2 occurs under such circumstances that the error cannot be recovered by retry operation, loss of data can be reduced. As a result, more stable data reproduction can be implemented.

Description now will be given to this together with read operation.

FIG. 16 illustrates the flow of error correction processing during read operation.

First, data read processing is performed at Step F101. As a result, a number of sectors equivalent to a predetermined unit are read and stored in the buffer RAM 14. In case of access according to relative address, the control described under <1> or <2> above must be performed with respect to the first track in the read processing.

Next, at Step F102, the disk controller 13 takes in ECC block-by-ECC block sector data from the buffer RAM 14, and checks whether a sector error has occurred in any sector taken in. This can be judged, for example, by carrying out correction by C1 provided in each sector.

If there is no occurrence of a sector error here, the C1-corrected data is returned to the buffer RAM 14. Then, at Step F106, the redundancy sectors, that is, the C2 sectors are removed from the ECC block-by-ECC block sectors at the buffer RAM 14. Thus, only required data sectors are taken out, and the data read processing is completed. In other words, sector data with the C2 sectors removed at the buffer RAM 14 is outputted from the interface 17 through the host controller 32. In this case, outputted read data is correct data without errors.

If the occurrence of any sector error is detected at Step F102, C2 correction processing is subsequently performed at Step F103.

If sector correction by C2 is feasible, the operation proceeds from Step F104 to Step F105, and the read data taken in from the buffer RAM 14 is subjected to correction by C2. Thus, properly corrected data is obtained. The corrected data is written into the buffer RAM 14.

Then, at Step F106, the redundancy sectors, that is, the C2 sectors are removed from the ECC block-by-ECC block data. Thus, only required data sectors are taken out and outputted, and the data read processing is completed. In this case as well, outputted read data is correct data without errors.

If it is judged at Step F104 that C2 correction is infeasible, sector error correction processing is not performed. In this case, the disk controller 13 sends data, taken in from the buffer RAM 14 for error correction, back to the buffer RAM 14 without change. Then, at Step F106, the C2 sectors as redundancy sectors are removed from the uncorrected ECC block-by-ECC block data. Thus, only required data sectors are taken out, and the data read processing is completed. In this case, outputted read data can contain any error.

However, as is understood from the description referring to FIG. 11 to FIG. 15, there is a high possibility that a sector where an error has occurred is a C2 sector. Therefore, even if error correction is infeasible, there is a high probability that the error sector is deleted when the C2 sectors are deleted at Step F106 and data is outputted. For this reason, even if an error uncorrectable by C2 occurs, the loss of data due to the uncorrectable error can be reduced on the whole.

4. Setting of ECC Block in Correspondence with Head/Recording Surface/Zone

The ECC block structure is basically as described above. In this embodiment, the ECC block is further set in correspondence with the recording surface/zone of the magnetic disk 21 and the magnetic head 22.

In the example described referring to FIG. 17, the magnetic disks 21 in the HDD 10 have four recording surfaces: the front and back faces of the disk 21a and the front and back faces of the disk 21b. The HDD 10 is correspondingly provided with four magnetic heads 22a-1, 22a-2, 22b-1, and 22b-2. Further, each recording surface is divided into a number of zones.

In reality, these recording surfaces (or the zones on each recording surface) and magnetic heads do not necessarily have completely identical characteristics.

For example, the recording surfaces can be different in S/N due to defect on the disks or quality of the recording surfaces, or the heads can be different in the characteristics, such as sensitivity.

For this reason, to further enhance the recording density or yield, the suitable recording density can be set for each head and recording surface (and zone). This is the specialization of format.

For example, the following measures are taken with respect to the combination of recording surface and head: with respect to recording surfaces and heads wherein signals are recorded and reproduced with high definition, high-density recording is carried out. With respect to recording surfaces and heads relatively inferior in error rate, the recording density is lowered.

However, the above-mentioned differences in characteristics cannot be coped with undifferentiated specifications for ECC block constitution sometimes.

To cope with this, in this embodiment, the ECC block constitution is changed according to the recording surface/zone/head. That is, ECC blocks are set in correspondence with the recording surface/zone with which data is to be recorded or reproduced and the head to be used at that time.

Figure 18B:
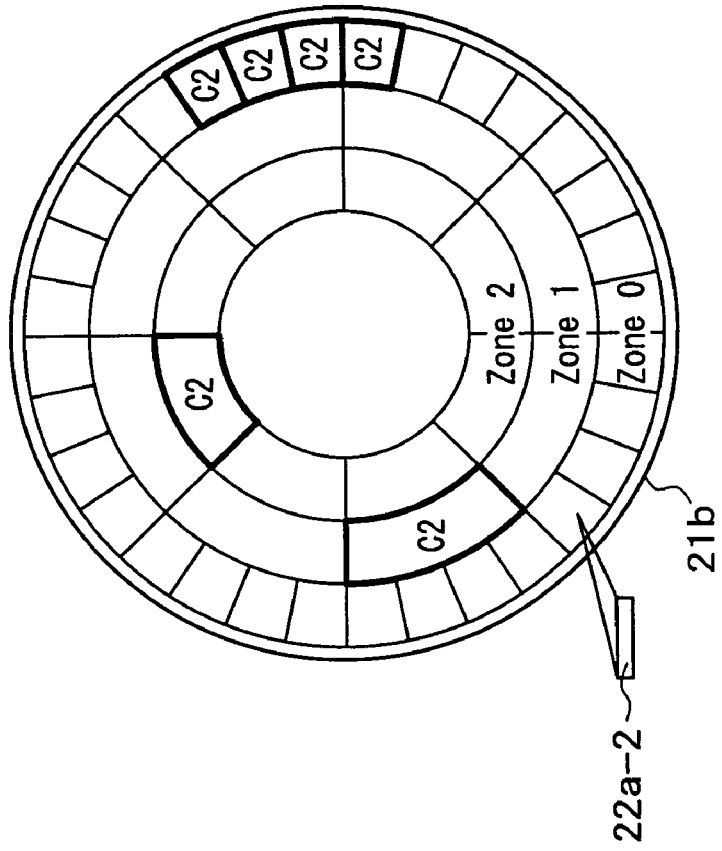
FIGS. 18A and 18B are explanatory drawings illustrating examples of the ECC constitution according to recording surface/zone/head in the embodiment.
Figure 18A:
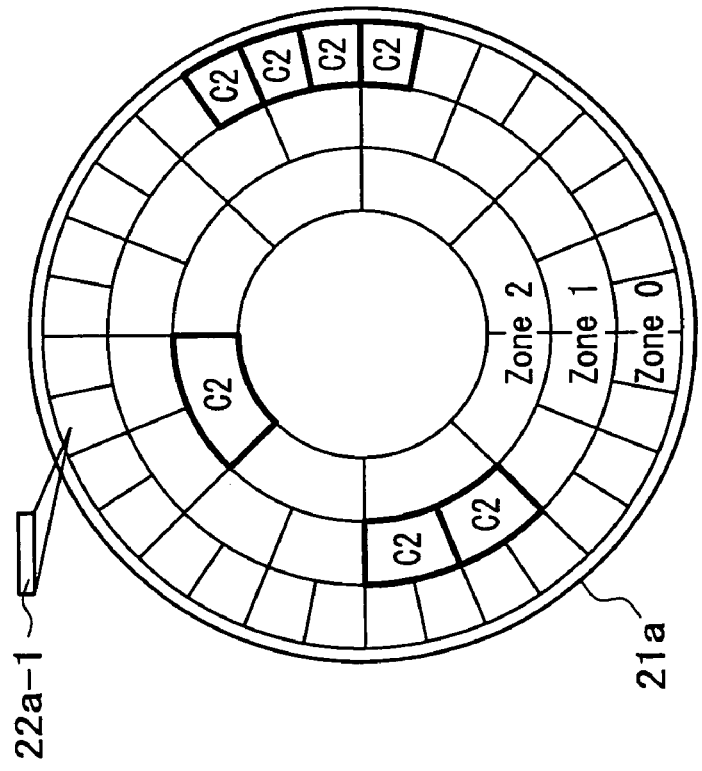

FIGS. 18A and 18B illustrate examples wherein the ECC constitution is made to differ between the front recording surface and the back recording surface of the disk 21a in the constitution illustrated in FIG. 17, for example.

FIG. 18A illustrates the front recording surface of the disk 21a, and in this case, the recording surface is divided into Zones 0, 1, and 2. Further, a magnetic head (down head) 22a-1 corresponds to the recording surface.

It is assumed that, in this example, the optimized concrete disposition of sectors is such that 32 sectors are provided in Zone 0, 16 sectors are provided in Zone 1, and 8 sectors are provided in Zone 2.

FIG. 18B illustrates the back recording surface of the disk 21a. In this case as well, the recording surface is divided into Zones 0, 1, and 2. A magnetic head (up head) 22a-2 corresponds to this recording surface.

It is assumed that, in this example, the optimized concrete disposition of sectors is such that 32 sectors are provided in Zone 0, 8 sectors are provided in Zone 1, and 8 sectors are provided in Zone 2.

As mentioned above, the disposition of sectors is varied not only by zone but also by recording surface and head. To provide the C1+C2 ECC block constitution in this case, ECC change control information based on recording surface/zone/head is used as described referring to FIG. 3.

As an example, it is assumed that the ECC block is constituted with redundancy of one sector to eight sectors, as illustrated in the figures. In this case, on the front recording surface of the magnetic disk 21a, the sectors are provided as illustrated in FIG. 1A:

Zone 0: of 32 sectors, 28 sectors are provided as data sectors and 4 sectors are provided as C2 sectors, Zone 1: of 16 sectors, 14 sectors are provided as data sectors and 2 sectors are provided as C2 sectors, and Zone 2: of 8 sectors, 7 sectors are provided as data sectors and 1 sector is provided as a C2 sector.

On the back recording surface of the magnetic disk 21a, the sectors are provided as illustrated in FIG. 18B:

Zone 0: of 32 sector, 28 sectors are provided as data sectors and 4 sectors are provided as C2 sectors, Zone 1: of 8 sectors, 7 sectors are provided as data sectors and 1 sector is provided as a C2 sector, and Zone 2: of 8 sectors, 7 sectors are provided as data sectors and 1 sector is provided as a C2 sector.

That is, with respect to Zone 1, different set values are given to the front face and the back face of the disk 21a.

With this ECC block constitution, every area can be provided with C2 with redundancy of one sector to eight sectors.

This constitution can bring the following advantage, for example, even if a given HDD is provided with disks with their format specialized so that the disposition of sectors defers depending on recording surface, zone, and head: an ECC block constitution having correcting capability which corresponds more precisely to requirements can be implemented on the entire faces of the disks.

In this example, the ECC blocks are constituted on a track-by-track basis. However, the ECC blocks need not necessarily be constituted on a track-by-track basis to make the ECC block constitution differ depending on recording surface/zone/head, needless to add.

Further, the actual ECC block constitution need not necessarily completely independently correspond to the number of zones to be changed and the number of heads to be changed.

More specific description will be given. If the zone is identical and the head differs, like Zone 0 and Zone 2 on the front face and the back face, illustrated in FIGS. 18A and 18B, the same ECC block constitution may be adopted. Or, the ECC block constitution may be made to differ from block to block.

Further, in the actual ECC block constitution, each zone is not necessarily provided with a simply dividable number of sectors as in the examples in FIGS. 18A and 18B. Therefore, the present invention is applicable to requests to provide redundancy within a desired range, rather than completely equalizing the redundancy to provide ECC block constitutions. Also, it is applicable to requests to provide correcting capability whose level is equal to or higher than a desired level of correcting capability.

Figure 19A:
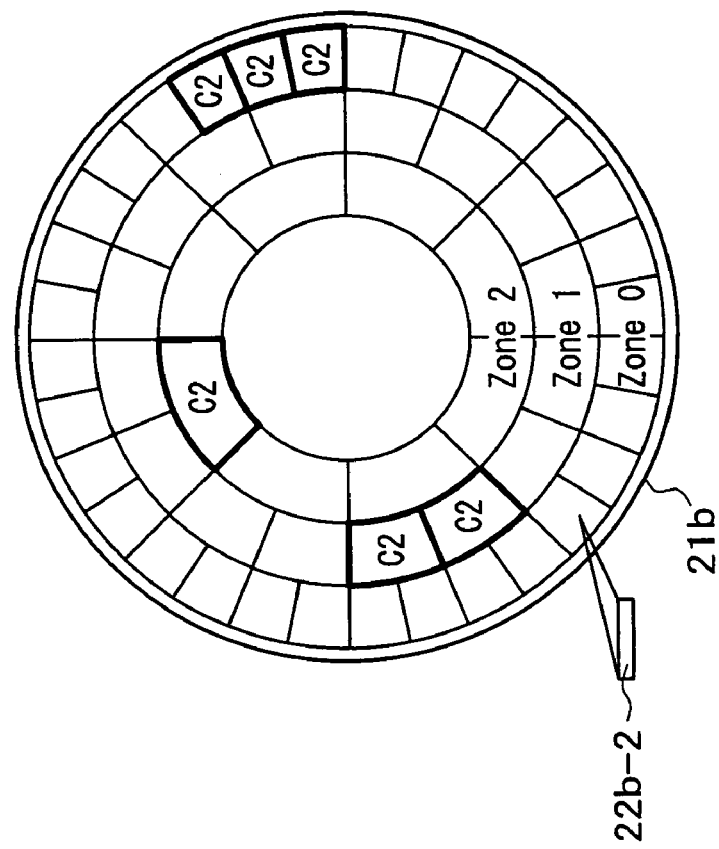
FIGS. 19A and 19B are other explanatory drawings illustrating examples of the ECC constitution according to recording surface/zone/head in the embodiment.
Figure 19B:
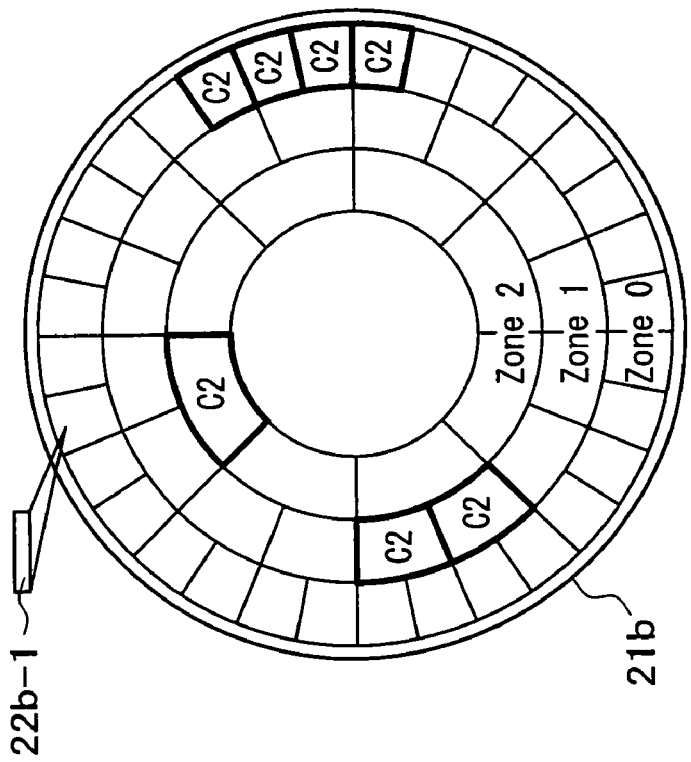

FIGS. 19A and 19B illustrate other examples of the ECC block constitution.

FIGS. 19A and 19B illustrate examples wherein the ECC constitution is made to differ between the front recording surface and the back recording surface of the disk 21b in the constitution illustrated in FIG. 17, for example.

FIG. 19A illustrates the front recording surface of the disk 21b, and in this case, the recording surface is divided into Zones 0, 1, and 2. Further, a magnetic head (down head) 22b-1 corresponds to the recording surface.

It is assumed that, in this example, the optimized concrete disposition of sectors is such that 32 sectors are provided in Zone 0, 16 sectors are provided in Zone 1, and 8 sectors are provided in Zone 2.

FIG. 19B illustrates the back recording surface of the disk 21b. In this case as well, the recording surface is divided into Zones 0, 1, and 2. A magnetic head (up head) 22b-2 corresponds to this recording surface. It is assumed that with respect to the back face as well as the front face, the optimized concrete disposition of sectors is such that 32 sectors are provided in Zone 0, 16 sectors are provided in Zone 1, and 8 sectors are provided in Zone 2.

In this example, consideration is given to defect in media, difference in S/N, or difference in the characteristics, such as sensitivity, of heads as variation from head to head and from disk recording surface to disk recording surface. Then, the correcting capability of the ECC block is correspondingly made different between the front face and the back face.

That is, the C1+C2 ECC block constitution is changed according to the characteristics of the recording surface/zone/head so that appropriate correcting capability is respectively obtained.

As illustrated in the figures, on the front recording surface of the magnetic disk 21b, the sectors are provided as illustrated in FIG. 19A:

Zone 0: of 32 sectors, 28 sectors are provided as data sectors and 4 sectors are provided as C2 sectors, Zone 1: of 16 sectors, 14 sectors are provided as data sectors and 2 sectors are provided as C2 sectors, and Zone 2: of 8 sector, 7 sectors are provided as data sectors and 1 sector is provided as a C2 sector.

On the back recording surface of the magnetic disk 21b, the sectors are provided as illustrated in FIG. 19B:

Zone 0: of 32 sector, 29 sectors are provided as data sectors and 3 sectors are provided as C2 sectors, Zone 1: of 16 sectors, 14 sectors are provided as data sectors and 2 sectors are provided as C2 sectors, and Zone 2: of 8 sector, 7 sectors are provided as data sectors and 1 sector is provided as a C2 sector.

That is, in this case, the error correcting capability of Zone 0 on the back face of the magnetic disk 21b is made lower than that of the other zones on the front face and the back face.

For example, if the error rate of Zone 0 on the back face of the magnetic disk 21b and in recording and reproducing operation by the magnetic head 22b-2 corresponding thereto is more favorable than those of the other zones and heads, the error correcting capability of Zone 0 on the back face may be lowered. If the error correcting capability of Zone 0 on the back face is lowered, the redundancy of that zone can be lowered, and thus the recording area can be effectively utilized.

That is, with respect to recording surfaces, zones or areas covered by magnetic heads whose error rate is low, the redundancy is not uselessly increased. Thereby, an efficient disk is obtained.

This constitution can bring the following advantage, even if a given HDD 10 is provided with disks with their ECC block constitution different depending on recording surface/zone and head: an ECC block constitution having correcting capability which corresponds more precisely to requirements can be implemented on the entire faces of the disks.

In the examples illustrated in FIGS. 19A and 19B, the ECC block constitution is set according to the recording surface/zone/head so that the error correcting capability is varied. This can be also implemented even if the ECC blocks are not necessarily constituted on a track-by-track basis.

Further, the actual ECC block constitution need not necessarily completely independently correspond to the number of recording surfaces/zones to be changed and the number of heads to be changed. More specific description will be given. If the zone is identical between the front and back recording surfaces and the head differs, like Zone 1 and Zone 2 in FIGS. 19A and 19B, the same ECC block constitution may be adopted. Or, the ECC block constitution may be made to differ from block to block.

Further, in the actual ECC block constitution, each zone is not necessarily provided with a simply dividable number of sectors as in the examples in FIGS. 19A and 19B. Therefore, the present invention is applicable to requests to provide redundancy within a desired range, rather than completely equalizing the redundancy to provide ECC block constitutions. Also, it is applicable to requests to provide correcting capability whose level is equal to or higher than a desired level of correcting capability.

FIGS. 18A and 18B and FIGS. 19A and 19B illustrate the following examples: examples wherein an appropriate sector constitution is set in correspondence with the recording surface/zone/head selected in recording or reproducing operation, and further the ECC block constitution is variable so that predetermined error correcting capability is obtained; and examples wherein the ECC block constitution is variable so that appropriate error correcting capability is obtained in correspondence with the recording surface/zone/head.

With respect to the characteristics of each recording surface, the characteristics of each zone, or the characteristics of each magnetic head 22, the format is specialized so that an appropriate number of sectors is respectively obtained. At this time, variation in error correcting capability is eliminated or unnecessary redundancy is eliminated. Thereby, efficient ECC blocks can be implemented, which is effective in enhancing the density and access/transfer rate.

If the recording surface or zone differs, the recording/reproducing clock frequency, track pitch, or disk rotational speed can be partly or completely changed.

In this embodiment, for example, data is recorded and reproduced at a different clock frequency from zone to zone. However, the number of revolutions of the spindle motor 24 can be changed on a zone-by-zone basis.

Further, because of demands for high-density recording or the like, the track pitch can be reduced on a specific recording surface. The recording/reproducing clock frequency, number of revolutions, and track pitch respectively have influence on error rate. Therefore, it is preferable that an appropriate ECC block constitution should be set according to these items.

In this embodiment, the ECC block constitution is changed depending on the recording surface or zone. As such, the ECC block constitution can be changed in correspondence with the recording/reproducing clock frequency, number of revolutions, and track pitch.

Therefore, that the ECC block constitution is changed according to the recording surface/zone/head refers to the following: the ECC block constitution can be comprehensively set in correspondence with various elements, including a combination of the characteristics of each head and the physical characteristics (the quality and defect of recording surfaces and track pitch) of each recording location (recording surface/zone), characteristics, such as clock, associated with signal processing, and characteristics, such as the number of revolutions, associated with motion.

Next, referring to FIG. 20 and FIG. 21, description will be given to processing performed in recording and reproducing operations for changing the ECC block constitution, as mentioned above.

Figure 20:
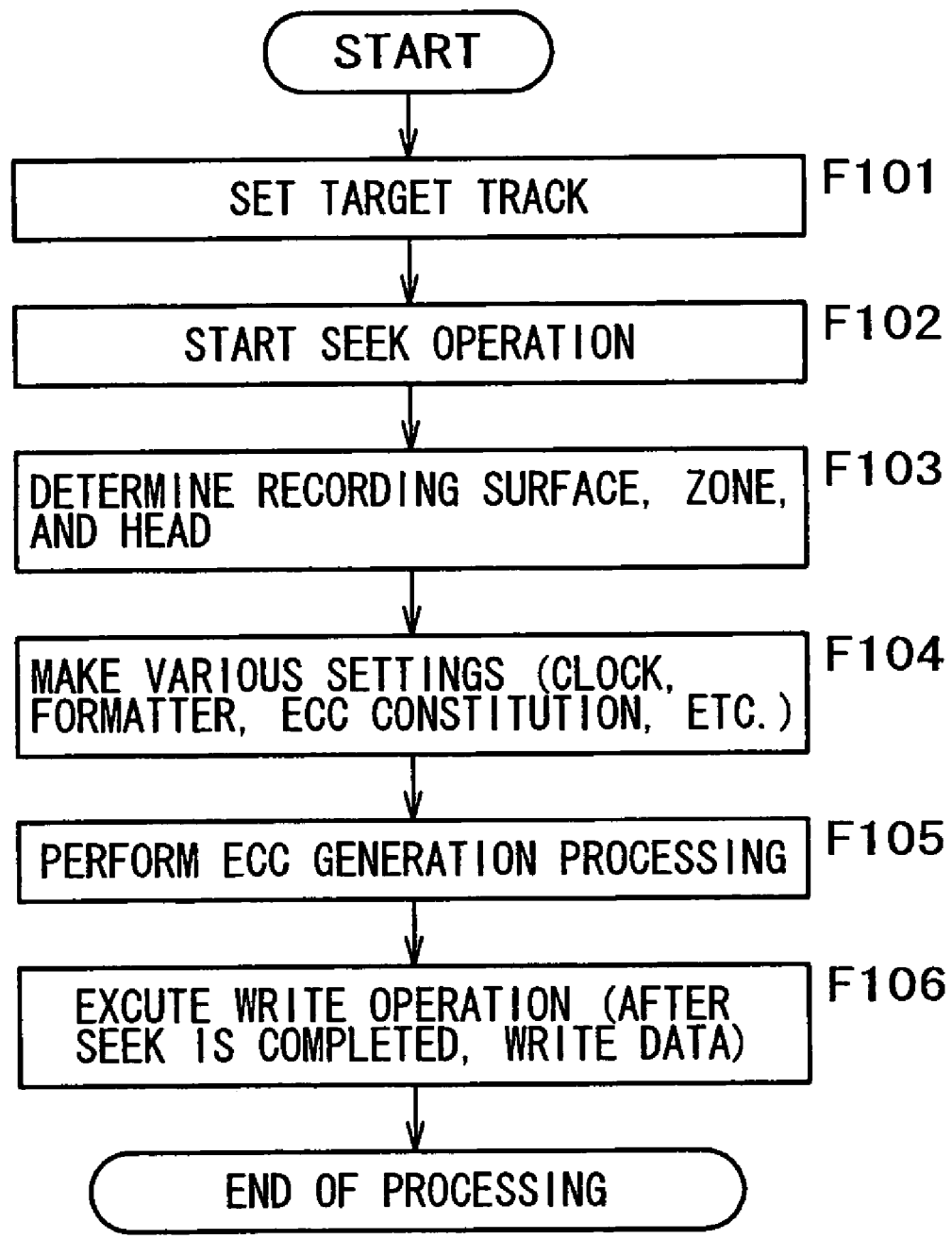
FIG. 20 is a flowchart illustrating the processing performed in recording operation in the embodiment.

FIG. 20 illustrates the processing implemented by the operation of each part, mainly the CPU 11 and the disk controller 13, illustrated in FIG. 1 during data write operation.

First, at Step F101, a target track to which data is to be written is set, and then at Step F102, seek operation is started.

At Step F103, a recording surface and a zone are determined from the target track values, and further a magnetic head 22 to be used is determined.

At Step F104, ECC change control information based on recording surface/zone/head and formatter control information are supplied, for example, from the CPU 11 to the disk controller 13, as described above. Then these information is sent to the various units in the disk controller 13 illustrated in FIG. 2.

In the disk formatter 35, for example, format information, such as the setting of recording clock determined with respect to each zone and the setting of sectors, is set. In the ECC controller 36, the ECC block constitution determined with respect to each recording surface/zone/head is set.

At Step F105, ECC generation processing is executed at the ECC controller 36 based on the above setting.

More specifically, data is sent through the buffer RAM 14, and ECC computation is carried out to add C1 and C2 to the data at the ECC controller 36. Then, the data is arranged in a predetermined format at the disk formatter 35, and sent to the data read/write control unit 15.

The data read/write control unit 15 generates a pattern to be ultimately written to the disk, and at Step F106, the data is actually written after seek operation is completed.

FIG. 21 illustrates the processing implemented by the operation of each part, mainly the CPU 11 and the disk controller 13, illustrated in FIG. 1 during data read operation.

At Step F201, a target track from which data is to be read is set, and then at Step F202, seek operation is started.

At Step F203, a recording surface/zone/head is determined from the target track values.

At Step F204, ECC change control information based on recording surface/zone/head and formatter control information are supplied, for example, from the CPU 11 to the disk controller 13. Such information is then sent to the various units in the disk controller 13 illustrated in FIG. 2.

In the disk formatter 35, for example, format information, such as the setting of recording clock determined with respect to each zone and the setting of sectors, is set. In the ECC controller 36, the ECC block constitution determined with respect to each recording surface/zone/head is set.

After these settings are made, at Step F205, seek operation is performed and then the processing of reading data from the disk 21 is performed. Then, data with ECC added thereto is sent into the disk controller 13 through the data read/write control unit 15.

The read data is sent through the disk formatter 35 and stored in the buffer RAM 14 by an amount equivalent to the unit of ECC constitution or more.

At Step F206, the ECC controller 36 performs ECC correction processing on the data stored in the buffer RAM 14 based on the ECC block constitution determined with respect to each recording surface/zone/head.

The order of this ECC decode is basically as follows: intra-sector correction is carried out by C1, and if any error cannot be corrected by this correction processing, inter-sector correction is subsequently carried out by C2.

In addition, whether to carry out C1+C2 correction or carry out only C1 correction may be selected arbitrarily (for example, with respect to each zone) and the selected correction may be carried out.

The result of ECC correction is reflected on the buffer RAM 14.

Then, the read data with errors corrected is sent out to the interface 17 through the host controller 32 with predetermined timing.

As mentioned above, the HDD 10 in this embodiment is capable of processing the ECC block constitution in correspondence with the recording surface/zone/head.

By constituting the efficient ECC blocks as mentioned above, a stable system wherein a wider range of random errors and burst errors can be corrected can be constituted.

5. Examples of Applications

The present invention is applicable not only to the above-mentioned examples but also to the various cases described below.

In the above-mentioned examples, the number of magnetic disks 21 in the HDD is two. Even if three or more magnetic disks are provided, the setting of ECC block constitution in correspondence with the recording surface/head is applicable, needless to add. Further, even if one disk 21 is provided, the setting of ECC block constitution in correspondence with the recording surface/head is applicable as long as the recording surface is formed on the front and back faces of the disk. This is because in this case, there are a number of (two) recording surfaces and heads.

Further, even if only one disk having only one recording surface is provided, the present invention is applicable as long as a number of zones are established on the recording surface. In this case, the ECC block constitution is set in accordance with combinations of the one head and individual zones.

Further, to such equipment that a number of magnetic heads 22 correspond to one recording surface, the present invention is applicable as long as the magnetic heads do not repeatedly trace the same track. In this case, the ECC block constitution is set in correspondence with the individual heads.

Further, the ECC block constitution change control can be carried out in either manner: the constitution may be completely changed with respect to each recording surface, zone, or head or may be partly changed.

The ECC block may be constituted on a track-by-track basis, as mentioned above, or may be constituted in any other manner. The present invention is applicable as long as an ECC block containing C1+C2 is taken as one unit.

In the above example, the setting of the ECC block constitution is changed by changing the C2 setting. However, changing the C1 setting is also possible, and changing both the C1 setting and the C2 setting is also possible.

Further, such setting change as described below is also possible: the C1+C2 ECC block constitution is used for some recording surface/zone/head, and the ECC block is constituted only of C1 for some recording surface/zone/head.

Further, for example, if the constitution of second error correcting code C2 is changed, the number of parity sectors of C2 sectors may be changed or the interleaved structure may be changed.

Further, the factors behind change in the ECC block constitution include the characteristics of media and the characteristics of heads. The resulting change in the disposition of sectors according to recording surface/zone/head may include the following: change in the number of sectors per track and change in ECC redundancy as well as change in track density, for example.

In general, disks 21 are fixedly built in HDD. However, HDD wherein disks 21 are detachable is possible. The present invention is also applicable to such a device.

In this case, the following measure can be taken to obtain ECC change control information (information on ECC block constitution for each recording surface/each zone) related to the recording surfaces/zones/heads of the loaded magnetic disks 21: the ECC change control information is recorded on the respective magnetic disks 21.

The present invention is applicable not only to HDD but also other types of disk recording/reproducing devices. For example, it is applicable not only to systems wherein the tracks on their disks are concentrically formed but also to systems wherein the tracks are spirally formed. Needless to add, the present invention is applicable not only to systems involving magnetic disks but also systems involving optical disks or magneto-optic disks.

The program according to the present invention is a program which implements the functions of the above-mentioned HDD 10. More specific description will be given. The program is started by the CPU 11. The various units in the HDD 10 are controlled according to the program, and thereby the processing illustrated in FIG. 20 and FIG. 21 is performed.

This program can be stored beforehand in the ROM/RAM 12, for example. Or, it may be stored on the magnetic disk 21 and loaded into the ROM/RAM 12.

Although the present invention has been described with reference to specific embodiments, those of skill in the art will recognize that changes may be made thereto without departing from the spirit and scope of the present invention as set forth in the hereafter appended claims.

The invention claimed is:

1. A data recording/reproducing device for a disk recording medium wherein concentric tracks are formed and each of the tracks is divided into a plurality of sectors, comprising:
   a seeking part for seeking a target track;
   a data accessing part for making makes access on the target track; and
   an error correcting part for generating error correcting codes for correcting errors in data, and for correcting the errors in data based on the error correcting codes; wherein the error correcting part sets a first error correcting code unit for a predetermined data amount unit, sets a second error correcting code unit for a plurality of the first error correcting code units, forms error correcting blocks including a plurality of the first error correcting code units and the second error correcting code units added thereto, and generates the error correcting blocks such that, when a head is moved to a track on the disk recording medium by the seeking part, a sector having the second error correcting code recorded therein is the first sector to be read by the data accessing part.

2. The data recording/reproducing device according to claim 1, wherein the error correcting part generates the error correcting blocks such that the second error correcting code is disposed at least at a head of the error correcting block.

3. The data recording/reproducing device according to claim 1, wherein the error correcting part generates the error correcting blocks such that the second error correcting code is disposed at least at a head and a tail of the error correcting block.

4. The data recording/reproducing device according to claim 1, wherein the error correcting part forms the error correcting blocks such that the error correcting blocks are completed by at least one track.

5. The data recording/reproducing device according to claim 1, wherein the error correcting part generates error correcting codes via a Reed-Solomon code system.

6. The data recording/reproducing device according to claim 1, wherein the error correcting block formed by the error correcting part has an interleaved structure in one of the first and second error correcting code units.

7. The data recording/reproducing device according to claim 1, wherein the disk recording medium includes servo areas formed in respective positions such that the servo areas are radially arranged on the disk recording medium.

8. The data recording/reproducing device according to claim 1, wherein the data accessing part starts write access at a leading sector which becomes accessible on the target track sought by the seeking part and accesses sectors equivalent to one track.

9. The data recording/reproducing device according to claim 8, wherein the data accessing part assigns relative position addresses to sectors in sequence, starting with a sector at which access was started on the target track, in write access, and rearranges the data read from the sectors on the target track according to relative position addresses so as to reproduce the written data in read access.

10. The data recording/reproducing device according to claim 8, wherein the error correcting part forms the error correcting blocks so that at least two error correcting blocks do not exist on each track and the error correcting blocks are completed by at least one track.

11. A data recording/reproducing method for a disk recording medium wherein concentric tracks are formed and each of the tracks is divided into a plurality of sectors, comprising:
　a seeking step in which a target track is sought;
　a data accessing step in which access is made on the target track; and
　an error correcting step in which error correcting codes are generated for correcting errors in data, and the errors in data are corrected based on the error correcting codes;
　wherein, in the error correcting step, a first error correcting code unit is set for a predetermined data amount unit, a second error correcting code unit is set for a plurality of the first error correcting code units, error correcting blocks including a plurality of the first error correcting code units and the second error correcting code units added thereto are formed, and the error correcting blocks are generated such that, when a head is moved to a track on the disk recording medium in the seeking step, a sector having the second error correcting code recorded therein is a first sector to be read in the data accessing step.

12. The data recording/reproducing method according to claim 11, wherein, in the error correcting step, the error correcting blocks are formed such that the second error correcting code is disposed at least at a head of the error correcting block.

13. The data recording/reproducing method according to claim 11, wherein, in the error correcting step, the error correcting blocks are formed such that the second error correcting code is disposed at least at a head and a tail of the error correcting block.

14. The data recording/reproducing method according to claim 11, wherein, in the error correcting step, the error correcting blocks are formed such that the error correcting blocks are completed by at least one track.

15. The data recording/reproducing method according to claim 11, wherein, in the error correcting step, error correcting codes are generated via a Reed-Solomon code system.

16. The data recording/reproducing method according to claim 11, wherein the error correcting block formed in the error correcting step has an interleaved structure in one of the first and second error correcting code units.

17. The data recording/reproducing method according to claim 11, wherein, in the data accessing step, write access is started at a leading sector which becomes accessible on the target track sought in the seeking step and sectors equivalent to one track are accessed.

18. The data recording/reproducing method according to claim 17, wherein, in the data accessing step, relative position addresses are assigned to sectors in sequence, starting with a sector at which access was started on the target track, in write access, and the data read from the sectors on the target track is rearranged according to relative position addresses so as to reproduce the written data in read access.

19. The data recording/reproducing method according to claim 17, wherein, in the error correcting step, the error correcting blocks are formed so that at least two error correcting blocks do not exist on each track and the error correcting blocks are completed by at least one track.

20. A recording medium, comprising:
　a plurality of concentrically formed tracks; and
　a plurality of sectors formed in each of the plurality of concentrically formed tracks;
　wherein a first error correcting code unit is set for a predetermined data amount unit, a second error correcting code unit is set for a plurality of the first error correcting code units, and error correcting blocks including a plurality of the first error correcting code units and the second error correcting code units added thereto are formed;
　wherein the error correcting block is set such that, when a head is moved to a track during a seek operation, a sector having the second error correcting code recorded therein is a first sector to be read; and
　wherein data having a constitution of the error correcting block is recorded on each of the plurality of tracks.

* * * * *